United States Patent
Anjo et al.

(10) Patent No.: US 7,076,719 B2
(45) Date of Patent: Jul. 11, 2006

(54) BUS SYSTEM AND RETRY METHOD

(75) Inventors: Kenichiro Anjo, Kanagawa (JP); Atsushi Okamura, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 414 days.

(21) Appl. No.: 10/306,685

(22) Filed: Nov. 27, 2002

(65) Prior Publication Data

US 2003/0101400 A1    May 29, 2003

(30) Foreign Application Priority Data

Nov. 28, 2001    (JP) .............................. 2001-362855

(51) Int. Cl.
   *H04L 1/18*    (2006.01)
(52) U.S. Cl. ........................... 714/749; 714/43; 714/56
(58) Field of Classification Search ................ 714/749, 714/56, 43, 48; 710/113, 105, 107, 305, 710/310; 370/462
   See application file for complete search history.

(56) References Cited

U.S. PATENT DOCUMENTS

| | | | | |
|---|---|---|---|---|
| 5,418,914 | A | * | 5/1995 | Heil et al. .................. 710/113 |
| 5,473,606 | A | * | 12/1995 | Hoekstra .................... 370/462 |
| 5,717,872 | A | * | 2/1998 | Whittaker ................... 710/105 |
| 5,943,483 | A | * | 8/1999 | Solomon ..................... 710/107 |
| 5,949,981 | A | * | 9/1999 | Childers ..................... 710/310 |
| 6,654,846 | B1 | * | 11/2003 | Franca-Neto .............. 710/305 |

FOREIGN PATENT DOCUMENTS

| | | |
|---|---|---|
| JP | 1-161562 | 6/1989 |
| JP | 1-229541 | 9/1989 |
| JP | 114750 | 5/1997 |
| JP | 2000-250850 | 9/2000 |

OTHER PUBLICATIONS

Copy of Japanese Office Action dated Jun. 1, 2004 (and English translation of relevant portion).
Copy of Japanese Office Action dated Jan. 4, 2005 (and English translation of relevant portion).

* cited by examiner

*Primary Examiner*—Guy Lamarre
*Assistant Examiner*—Fritz Alphonse
(74) *Attorney, Agent, or Firm*—Dickstein, Shapiro, Morin & Oshinsky, LLP.

(57) ABSTRACT

A slave interface is equipped with a register that stores a retry set value SRI that is unique for a slave device and a pseudo random number generator that generates a random number value RN, and when a non-acknowledgement response is sent corresponding to a transmission request REQb from a master device, the slave interface transmits non-acknowledgement response incidental information NAINFb that includes the retry set value SRI and the random number value RN to the master interface 2a. The master interface 2a extracts the retry set value SRI and the random number value RN from the non-acknowledgement response incidental information NAINFb, calculates a retry interval value by adding these, and when the interval time according to the retry interval value has passes, resends the transmission request REQb to the slave device. Since the retry interval time is independently set every time, live-lock may be prevented.

20 Claims, 15 Drawing Sheets

BUS SYSTEM AND RETRY METHOD

BACKGROUND OF THE INVENTION

1. Field of the Invention

The present invention relates to a bus system. In particular, it is related to a bus system and a retry method capable of avoiding development of live-lock between retries when a transmission request from a master device is rejected by a slave.

2. Description of the Prior Art

FIG. 12 is a diagram of an example of a conventional bus system. A first master device including a master unit 1-1 and a master interface 91-1 and a second master device including a master unit 1-2 and a master interface 91-2 are connected to a CW bus 3 that transmits commands, addresses, write data, etc. In addition, a slave device including a slave unit 5 and a slave interface 92 is connected to the CW bus 3. Furthermore, the master interface 91-1 of the first master device, the master interface 91-2 of the second master device, and the slave interface 92 of the slave device are connected to an RD bus 6 that transmits read data.

A transmission request REQm1, command CMDm1, address ADm1, and write data WDm1 are sent from the master unit 1-1 of the first master device to the master interface 91-1. In the opposite direction—from the master interface 91-1 to the master unit 1-1—a command acknowledgement CACKm1 or bus error signal BERm1 is sent. In addition, a transmission request REQb, command CMDb, and address/write data AD/WDb are sent from the master interface 91-1 to the slave interface 92 of the slave device via the CW bus 3. In the opposite direction—from the slave interface 92 to the master interface 91-1 via the CW bus 3—an acknowledgement response ACKb or non-acknowledgement response NACKb is sent.

In the same manner, a transmission request REQm2, command CMDm2, address ADm2, and write data WDm2 are sent from the master unit 1-2 to the master interface 91-2 of the second master device. In the opposite direction—from the master interface 91-2 to the master unit 1-2—a command acknowledgement CACKm2 or bus error signal BERm2 is sent. In addition, a transmission request REQb, command CMDb, and a multiplexed address/write data AD/WDb are sent from the master interface 91-2 to the slave interface 92 of the slave device via the CW bus 3. In the opposite direction—from the slave interface 92 to the master interface 91-2 via the CW bus 3—an acknowledgement response ACKb or non-acknowledgement response NACKb is sent.

From the slave interface 92 of the slave device to the slave unit 5, a transmission request REQs, command CMDs, address ADs, and write data WDs are sent. In the opposite direction—from the slave unit 5 to the slave interface 92—a command acknowledgement CACKs is sent.

Read data is sent from the slave unit 5 to the slave interface 92 with the read data RDs. Read data RDb is sent from the slave interface 92 to the master interface 91-1 of the first master device or the master interface 91-2 of the second master device via the RD bus 6. In the first master device, read data RDm1 is sent from the master interface 91-1 to the master unit 1-1; and in the second master device, read data RDm2 is sent from the master interface 91-2 to the master unit 1-2.

An arbitration circuit 7 is provided to decide usage rights (access) for the CW bus 3. A bus access request AREQm1 is sent from the master interface 91-1 of the first master device to the arbitration circuit 7, and a bus access request AREQm2 is sent from the master interface 91-2 of the second master device to the arbitration circuit 7. If the arbitration circuit 7 is to give bus access for the CW bus 3 to the first master device, it sends a grant signal AGNTm1 to the master interface 91-1. If the arbitration circuit 7 is to give bus access for the CW bus 3 to the second master device, it sends a grant signal AGNTm2 to the master interface 91-2.

FIG. 13 is a partial internal block diagram relating to the CW bus 3 of the master interface 91. In FIG. 13, the portion relating to the RD bus 6, more specifically the portion relating to the reception of read data, is omitted. A master protocol control circuit 11 receives transmission requests and commands from the master unit 1 and controls communication between the master unit 1 and the slave device based on protocol. A preset retry interval value RIN is stored in a retry interval value register 12. Once a non-acknowledgement response NACKb is received the counter value is reset and then the retry interval counter 13 keeps track of the number of clock pulses by incrementing the counter value each time a pulse of the clock CLK is input. The comparator 14 detects if the count value of the retry interval counter 13 matches the retry interval value RIN and makes the retry time alert signal RT to be active level. A permissible retry count PRC is stored beforehand in a retry attempt register 15. After resetting the count value as a result of the transmission request REQm from the master unit 1, a retry attempt counter 16 increments the count value every time a non-acknowledgement response NACKb is received. Once the comparator 17 detects that the count value has become a value greater than the permissible retry count PRC in the retry attempt register 15, it makes the overflow signal OF active level. In the case where the retry request circuit 18 detects that the retry time alert signal RT has changed to the active level when the overflow signal OF is at the inactive level, a retry activation request signal RRQ is sent to the master protocol control circuit 11. When the retry activation request signal RRQ is received, the master protocol control circuit 11 resends the transmission request REQb, command CMDb, and address (the address portion of the AD/WD). A bus error determination circuit 19 detects that the overflow signal OF has changed to the active level and outputs a bus error signal BERm.

FIG. 14(a) is an operation sequence chart for the conventional bus system shown in FIG. 12 and FIG. 13. The operation carried out when two master devices send out successive read transmission requests to a single slave device is illustrated in FIG. 14(a), which is referenced to describe the operation of the conventional bus system of FIG. 12.

At time point T11, a transmission request REQm1 is sent from the master unit 1-1 to the master interface 91-1. At the same time, the address ADm1, command CMDm1, etc. are simultaneously delivered to the master interface 91-1.

The master interface 91-1 makes a request for CW bus 3 bus access to the arbitration circuit 7, and if bus access is granted and the CW bus 3 is not in use, the transmission request REQb is sent out over the CW bus 3. The retry attempt counter 16 within the master interface 91-1 is reset to zero.

The slave interface 92 receives the transmission request REQb, address write data AD/WDb, and command CMDb from the master unit 1-1 via the CW bus 3, and in accordance with the received command CMDb and the status of the slave unit 5, it is determined whether to receive that transmission request REQb or reject it. As the slave unit 5 is in a reception ready state, the slave interface 92 outputs the acknowledgement response ACKb and also transmits a transmission request REQs to the slave unit 5.

Upon receiving the acknowledgement response ACKb, the master interface 91-1 sends a command acknowledgement CACKm1 to the master unit 1-1. At the same time, data phase transmission commences. With the data phase, in the case where there is a write-operation, the master interface 91-1 makes a request for write data to the master unit 1-1 and outputs the received data to the CW bus 3, however, this case is read-operation, so the master interface releases the CW bus 3 and waits a predetermined length of time until the read data is prepared.

Meanwhile, at time point T12, it is assumed that a transmission request REQm2 is sent from the master unit 1-2 to the master interface 91-2. At the same time, the address ADm2, command CMDm2, etc. are delivered to the master interface 91-2.

The master interface 91-2 makes a request for CW bus 3 bus access to the arbitration circuit 7, waits until it is accessible since it is in use, and then once bus access is granted, sends the transmission request REQb over the CW bus 3. The retry attempt counter 16 of the master interface 91-2 is reset to zero.

The slave interface 92 receives the transmission request REQb, address ADb, and command CMDb from the master unit 1-2 via the CW bus 3. Nevertheless, since the slave unit 5 is busy with processing the transmission request from the master unit 1-2, the slave interface 92 decides to reject the transmission request REQb and returns a non-acknowledgement response NACKb.

The master interface 91-2, after opening of the CW bus 3 upon reception of the non-acknowledgement response NACKb, releases the CW bus 3 and then increments the count value of the retry attempt counter 16 and determines whether or not it is greater than the permissible retry count PRC stored in the retry attempt register 15. In the case where the count value has exceeded the permissible retry count PRC, the bus error determination circuit 19 outputs the bus error signal BERm1. However, in the case of FIG. 14(*a*), as the count value is smaller than the permissible retry count PRC, the master interface 91-2 waits merely the length of time (the retry interval time) Tri until the retry interval counter 13 has counted a number of clock pulses equivalent to the retry interval value RIN stored in the retry interval value register 12.

Once the transmission preparation of the read data corresponding to the transmission request from the master interface 1-1 is completed, the slave interface 92 receives the read data RDs from the slave unit 5 and outputs the read data RDb to the RD bus 6.

The master interface 91-1 receives the read data RDb via the RD bus 6 and transmits the read data RDm1 to the master unit 1-1. At time point T13, the master unit 1-1 receives read data RDm1 and finishes processing of the read transmission request from the master unit 1-1.

Meanwhile, with the master interface 1-2, when the count value of the retry interval counter 13 reaches retry interval value RIN, the protocol control circuit 11 again makes a request for CW bus 3 bus access to the arbitration circuit 7. Once bus access is granted, the transmission request REQb is output over the bus.

The slave interface 92 receives the transmission request REQb, address ADb, and command CMDb from the master unit 1-2 via the CW bus 3, and as the slave unit 5 is reception ready this time, the slave interface 92 outputs an acknowledgement response ACKb over the CW bus 3 and also sends out a transmission request REQs to the slave unit 5.

Upon receiving the acknowledgement response ACKb, the master interface 91-2 sends a command acknowledgement CACKm2 to the master unit 1-2, releases the CW bus 3, and waits a predetermined length of time until the read data is prepared. Once the transmission preparation of the read data corresponding to the transmission request from the master interface 1-2 is completed, the slave interface 92 receives the read data RDs from the slave unit 5 and outputs the read data RDb to the RD bus 6. The master interface 91-2 receives the read data RDb via the RD bus 6 and transmits the read data RDm2 to the master unit 1-2. At time point T14, the master unit 1-2 receives read data RDm2 and finishes processing of the read transmission request from the master unit 1-2.

The timing chart of FIG. 14(*b*) illustrates the operation described above using FIG. 14(*a*) in a timing chart. In FIG. 14(*b*), there is shown the bus access request AREQm1 to the arbitration circuit 7 from the master interface 91-1 and the corresponding grant signal AGNTm1 that grants bus access to the master interface 91-1 from the arbitration circuit 7, as well as the bus access request AREQm2 to the arbitration circuit 7 from the master interface 91-2 and the corresponding grant signal AGNTm2 that grants bus access to the master interface 91-2 from the arbitration circuit 7.

With the conventional bus system, as shown here, even when transmission requests from a plurality of master units to one slave unit converge, coordination of and response to a plurality of transmission requests is possible.

Nevertheless, for example as shown in FIG. 12, in the case where the transmission request ACKb from the master unit 1-1 to the slave unit 5 periodically occurs and this matches the period of the transmission request ACKb generated based on the retry interval value RIN from the master unit 1-2, the situation where the transmission request from the master unit, 1-2 is continually rejected and not executed may continue. This is called live-lock, and since it causes a remarkable drop in bus transmission efficiency, is necessary to prevent its occurrence before it happens and if it does happen, expeditiously resolve it.

FIG. 15 is an operational sequence chart illustrating an incidence of live-lock. At time point T1, the transmission request REQm1 is transmitted from the master unit 1-1, and at time point T2, the transmission request REQm2 is transmitted from the master unit 1-2, however, since the transmission request first sent from the master unit 1-1 is received and the slave unit 5 becomes busy, the transmission request from the master unit 1-2 is rejected at the slave interface 92 and the non-acknowledgement response NACKb is returned to the master interface 91-2. The slave interface 92 begins clocking the retry interval time Tri after receiving the non-acknowledgement response NACKb.

Meanwhile, the read data RDm1 corresponding to the transmission request of the master unit 1-1 is transmitted at time point T3 from the slave unit 5 to the master unit 1-1 via the RD bus 6 and the read processing is completed. Immediately afterwards, the master unit 1-1 transmits the next transmission request REQm1. Accordingly, the transmission request from the master unit 1-1 is received and the slave unit 5 becomes busy again.

The master interface 91-2 detects that the retry interval time Tri has passed and then resends the transmission request REQb to the slave interface 92, however, as the slave unit 5 is busy it is rejected and the non-acknowledgement response NACKb is again returned to the master interface 91-2. The master interface 91-2 again begins clocking the retry interval time Tri after receiving the non-acknowledgement response NACKb.

In the case of FIG. 15, since the send period of the transmission request from the master unit 1-1 matches the resend period of the transmission request from the master interface 91-2, from this point forward only the transmission request from the master unit 1-1 continues to be executed. As the rejection of the transmission request from the master unit 1-2 continues, it becomes live-lock.

In the case where live-lock develops, in order to resolve it, either the transmission requests of the master device that is periodically sending transmission requests (in FIG. 15, the master unit 1-1) must be temporarily halted, or the master device that is experiencing live-lock (in FIG. 15, the master interface 91-2) must change the length of the retry interval time between transmission request resend attempts.

A method of temporarily halting the master device making the periodic transmission requests is disclosed in Japanese Patent Application Laid-open No. 2000-315188, wherein there is a technique that monitors bus transactions and performs control so as to cause the master device experiencing live-lock to use the bus exclusively once live-lock has developed. While use of this technique makes it possible to reliably resolve live-lock, since it is necessary to provide a live-lock detection circuit in each corresponding master device in order to detect whether a live-lock situation exists in the bus access arbitration circuit and also provide a circuit that sets exclusive bus usage for the master device that has detected a live-lock situation, the amount of hardware increases dramatically for the bus access arbitration circuit.

As for changing the length of the retry interval time for a master device experiencing live-lock, Japanese Patent Application Laid-open No. Hei 9-114750 discloses a technique whereby a plurality of retry interval time registers is provided in a master device. Then in the case where the non-acknowledgement response is consecutively received a predetermined number of times while set to the retry interval time of a first register, it is switched to a differing retry interval time of a second register. If even with this the non-acknowledgement response is received a predetermined number of times, it is subsequently switched to a different retry interval time of a third register. However, in the case where the bus is connected to a plurality of slave devices, the amount of time needed for slave device reading/writing differs drastically depending on slave device functionality such as whether a slave device has high-speed memory or low-speed peripheral devices. As a result, the appropriate retry interval time also differs for each slave device for which a transmission request may be sent. Accordingly, when a plurality of slave devices are connected to a bus, within each master device, not only must a register group that includes a plurality of registers be given for each individual slave device, but also a plurality of register groups must be provided corresponding to the plurality of slave devices, which dramatically increases the amount of hardware for the master devices.

In Japanese Patent Application Laid-open No. 2000-250850, a technique is disclosed whereby a first timetable stored with a primary retry interval time and a second timetable stored with a shorter interval time are provided to give the retry interval times for the slave device. When the first non-acknowledgement response is returned, the master device is notified of the retry interval time of the first timetable, and then upon return of the second and subsequent non-acknowledgement responses, the master device is notified of the retry interval time of the second timetable. After receiving the first non-acknowledgement response, the master device waits until the primary retry interval time of the first timetable has passed and then resends the transmission request; then after receiving the second and subsequent non-acknowledgement responses, it waits until the retry interval time of the second timetable has passed to resend the transmission request. With this technique, since the slave device is stored with a unique primary retry interval time, it is not necessary to store retry interval times that are adapted to the respective slave devices on the master side, and is thus an improvement over the technique disclosed in Japanese Patent Laid-open Hei 9-114750. However, there is still a possibility that the retry interval time of the second timetable will match the period of a transmission request from another master device causing live-lock to develop, and once in a live-lock situation, it may not be easily resolved. Nevertheless, with this technique, since substantially exclusive rights may be obtained if the retry interval time of the second timetable is set extremely short, processing of the transmission request from a master device that has received a non-acknowledgement response two or more times can be given priority and it is possible to prevent development of live-lock. However, when the slave device sent the transmission request is a device for which reading/writing takes time such as with a peripheral device, since the bus is monopolized through this technique, transmission between other master devices and slave devices connected to the bus may be halted for a long time, causing bus usage efficiency to drop.

BRIEF SUMMARY OF THE INVENTION

Objects of the Invention

The object of the present invention is to provide a bus system and retry method capable of preventing the development of live-lock or if it should fall into a live-lock situation, resolve it, and in addition, accomplish this with a smaller increase in the amount of hardware than conventional techniques.

SUMMARY OF THE INVENTION

A first aspect of the present invention provides a bus system that is configured including a slave interface and a master interface. The slave interface, which is provided between a slave unit and a bus and is equipped with a retry set value storage circuit that stores a retry set value uniquely set for the slave unit and a pseudo-random number generator that generates a pseudo random number, transmits a non-acknowledgement response when rejecting to respond to a transmission request from a master unit, and also transmits non-acknowledgement response incidental information that includes the retry set value and the random number generated by the pseudo-random number generator to the master unit via the bus. The master interface, which is provided between the master unit and the bus and is equipped with an adder that adds the retry set value extracted from the non-acknowledgement response incidental information and the random number, and a retry interval value storage circuit that stores the added result as a retry interval value, determines the length of time until the transmission request is to be resent based on the retry interval value.

A second aspect of the present invention provides a bus system that is configured including a slave interface and a master interface. The slave interface, which is provided between a slave unit and a bus, includes an address decoder that receives from a master unit a transmission request and an address via the bus and outputs an address condition detection signal if the transmission request is for the slave unit; a response condition determination circuit that determines whether or not to respond to the transmission request from the master unit depending on the address condition detection signal, a command from the master unit, and operational conditions of the slave unit, and either outputs an acknowledgement response to the bus when ready for response or outputs anon-acknowledgement response to the bus when not ready for response; a retry set value storage circuit that stores a retry set value uniquely set for the slave unit; a pseudo-random number generator that is activated with a predetermined signal so as to generate a random number; and a non-acknowledgement response incidental information generating circuit that follows when the non-acknowledgement response is output and outputs non-acknowledgement response incidental information, which includes the retry set value and the random number value generated by the pseudo-random number generator. The master interface, which is provided between the master unit and the bus, includes: a retry information extraction circuit that inputs the non-acknowledgement response incidental information from the bus and extracts and outputs the retry set value and the random number value; an adder that calculates a retry interval value by adding the retry set value and the random number value; a retry interval counting unit that begins counting clock pulses upon reception of the non-acknowledgement response and outputs a retry time notification signal upon detection that the counted value has reached the retry interval value; a retry count counting unit that begins counting the number of times the non-acknowledgement response is received once the transmission request is received from the master unit and outputs an overflow signal upon detection that the counted value has exceeded a preset permissible retry count; a retry request circuit that activates resending of the transmission request upon detection that the overflow signal is inactive level and the retry time notification signal is active level; and a bus error determination circuit that determines an occurrence of a bus error based on the overflow signal and outputs a bus error signal to the master unit.

A third aspect of the present invention provides a bus system is configured including a slave interface and a master interface. The slave interface, which is provided between a slave unit and a bus and is equipped with a retry set value storage circuit that stores a retry set value uniquely set for the slave unit, transmits a non-acknowledgement response when rejecting to respond to a transmission request from a master unit, and also transmits non-acknowledgement response incidental information that includes a retry set value to the master unit via the bus. The master interface, which is provided between the master unit and the bus and is equipped with a pseudo-random number generator that generates a pseudo-random number, an adder that adds the generated random number value and the retry set value extracted from the non-acknowledgement response incidental information, and a retry interval value storage circuit that stores the added result as a retry interval value, determines the length of time until the transmission request is to be resent based on the retry interval value.

A fourth aspect of the present invention provides a bus system configured including a slave interface and a master interface. The slave interface, which is provided between a slave unit and a bus, includes: an address decoder that receives from a master unit a transmission request and an address via the bus and outputs an address condition detection signal if the transmission request is for the slave unit; a response condition determination circuit that determines whether or not to respond to a transmission request from the master unit depending on the address condition detection signal, a command from the master unit, and operational conditions of the slave unit, and either outputs an acknowledgement response to the bus when ready for response or outputs a non-acknowledgement response to the bus when not ready for response; a retry set value storage circuit that stores a retry set value uniquely set for the slave unit; and a non-acknowledgement response incidental information generating circuit that follows when the non-acknowledgement response is output and outputs non-acknowledgement response incidental information, which includes the retry set value. The master interface, which is provided between the master unit and the bus, includes: a retry information extraction circuit that inputs the non-acknowledgement response incidental information from the bus and extracts and outputs the retry set value; a pseudo-random number generator that is activated with a predetermined signal so as to generate a pseudo-random number; an adder that calculates a retry interval value by adding the retry set value and the random number value generated by the pseudo-random number generator; a retry interval counting unit that begins counting clock pulses upon reception of the non-acknowledgement response and outputs a retry time notification signal upon detection that the counted value has reached the retry interval value; a retry count counting unit that begins counting the number of times the non-acknowledgement response is received once the transmission request is received from the master unit and outputs an overflow signal upon detection that the counted value has exceeded a preset permissible retry count; a retry request circuit that activates resending of the transmission request upon detection that the overflow signal is inactive level and the retry time notification signal is active level; and a bus error determination circuit that determines an occurrence of a bus error based on the overflow signal and outputs a bus error signal to the master unit.

A fifth aspect of the present invention provides a bus system configured including a slave interface and a master interface. When rejecting to respond to a transmission request from a master unit, the slave interface, which is provided between a slave unit and the bus and is equipped with a retry set value storage circuit that stores a retry set value uniquely set for the slave unit, a pseudo-random number generator that generates a pseudo-random number, and an adder that generates a retry interval value by adding the generated random number value and the retry set value, transmits a non-acknowledgement response and also transmits non-acknowledgement response incidental information that includes the retry interval value to the master unit via the bus. The master interface, which is provided between the master unit and the bus and is equipped with a retry interval value storage circuit that stores the retry interval value extracted from the non-acknowledgement response incidental information, determines the length of time until the transmission request is to be sent based on the retry interval value.

A sixth aspect of the present invention provides a bus system configured including a slave interface and a master interface. The slave interface, which is provided between a slave unit and a bus, includes: an address decoder that receives from a master unit a transmission request and an address via the bus and outputs an address condition detection signal if the transmission request is for the slave unit; a response condition determination circuit that determines whether or not to respond to the transmission request from the master unit depending on the address condition detection signal, a command from the master unit, and operational conditions of the slave unit, and either outputs an acknowledgement response to the bus when ready for response or outputs a non-acknowledgement response to the bus when not ready for response; a retry set value storage circuit that stores a retry set value uniquely set for the slave unit; a pseudo-random number generator that is activated with a predetermined signal so as to generate a pseudo-random number; an adder that generates a retry interval value by adding the random number value generated by the pseudo-random number generator and the retry set value; and a non-acknowledgement response incidental information generating circuit that follows when the non-acknowledgement response is output and outputs non-acknowledgement response incidental information, which includes the retry set value. The master interface, which is provided between the master unit and the bus, includes: a retry information extraction circuit that inputs the non-acknowledgement response incidental information from the bus and extracts and outputs the retry interval value; a retry interval counting unit that begins counting clock pulses upon reception of the non-acknowledgement response and outputs a retry time notification signal upon detection that the counted value has reached the retry interval value; a retry count counting unit that begins counting the number of times the non-acknowledgement response is received once the transmission request is received from the master unit and outputs an overflow signal upon detection that the counted value has exceeded a preset permissible retry count; a retry request circuit that activates resending of the transmission request upon detection that the overflow signal is inactive level and the retry time notification signal is active level; and a bus error determination circuit that determines an occurrence of a bus error based on the overflow signal and outputs a bus error signal to the master unit.

A seventh aspect of the present invention provides a retry method for transmission requests of a bus system that has a master device and a slave device connected via a bus. The retry method is characterized by determining the length of time until a transmission request is to be resent to the slave device the master device based on a retry interval value obtained by adding a retry set value uniquely set for the slave device and a pseudo-randomly generated random number value.

DETAILED DESCRIPTION OF THE INVENTION

Determination of the length of time elapsing before resending a transmission request to a slave device from a master device based on the retry interval value obtained by adding a retry set value uniquely determined for the slave device and a random number obtained through pseudo-random number generation is a common point in the embodiments of the present invention given below. The present invention is described forthwith in detail while referencing the drawings.

Figure 1:
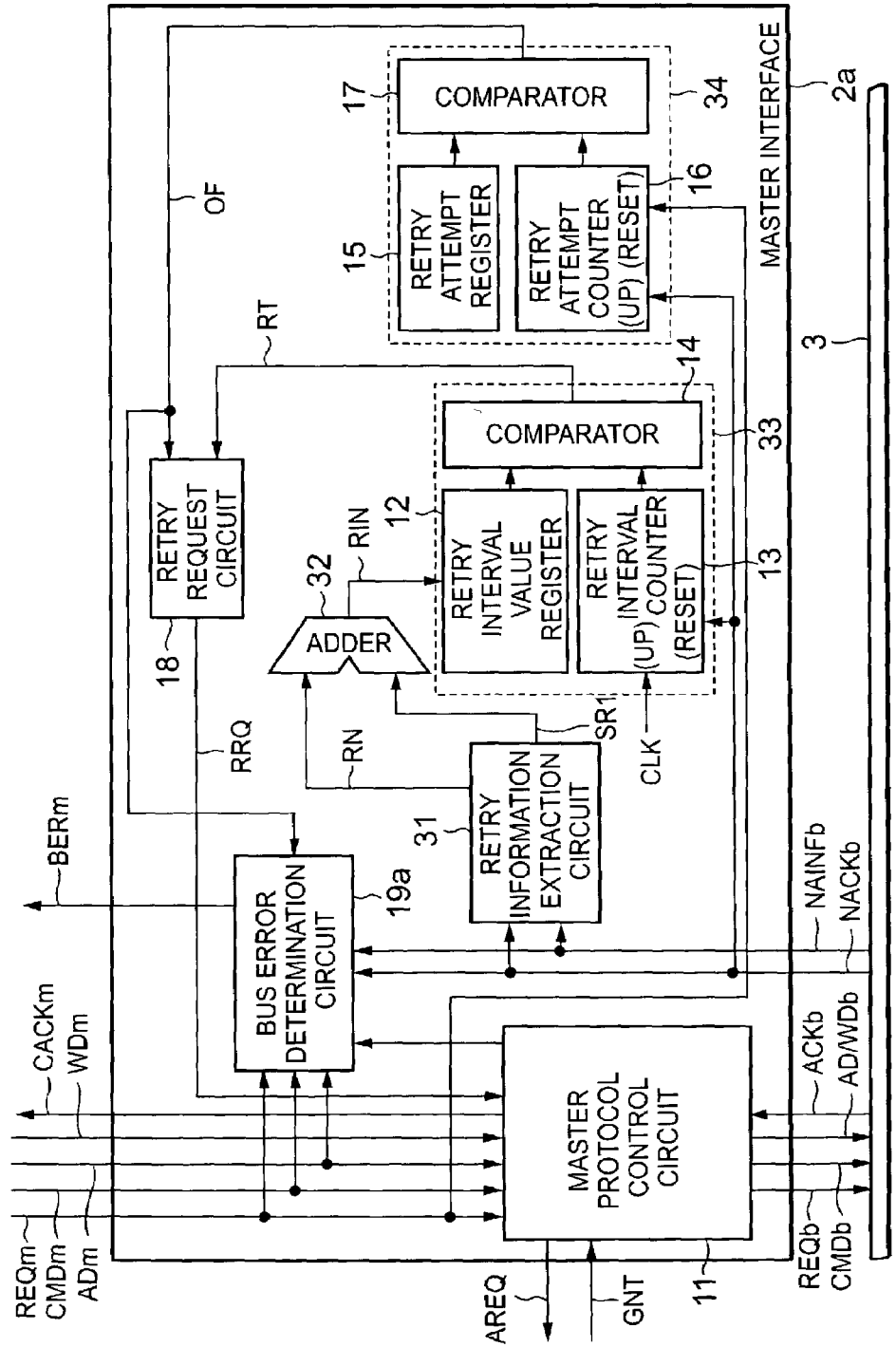
FIG. 1 is a block diagram of a master interface of the first embodiment of the present invention.
Figure 2:
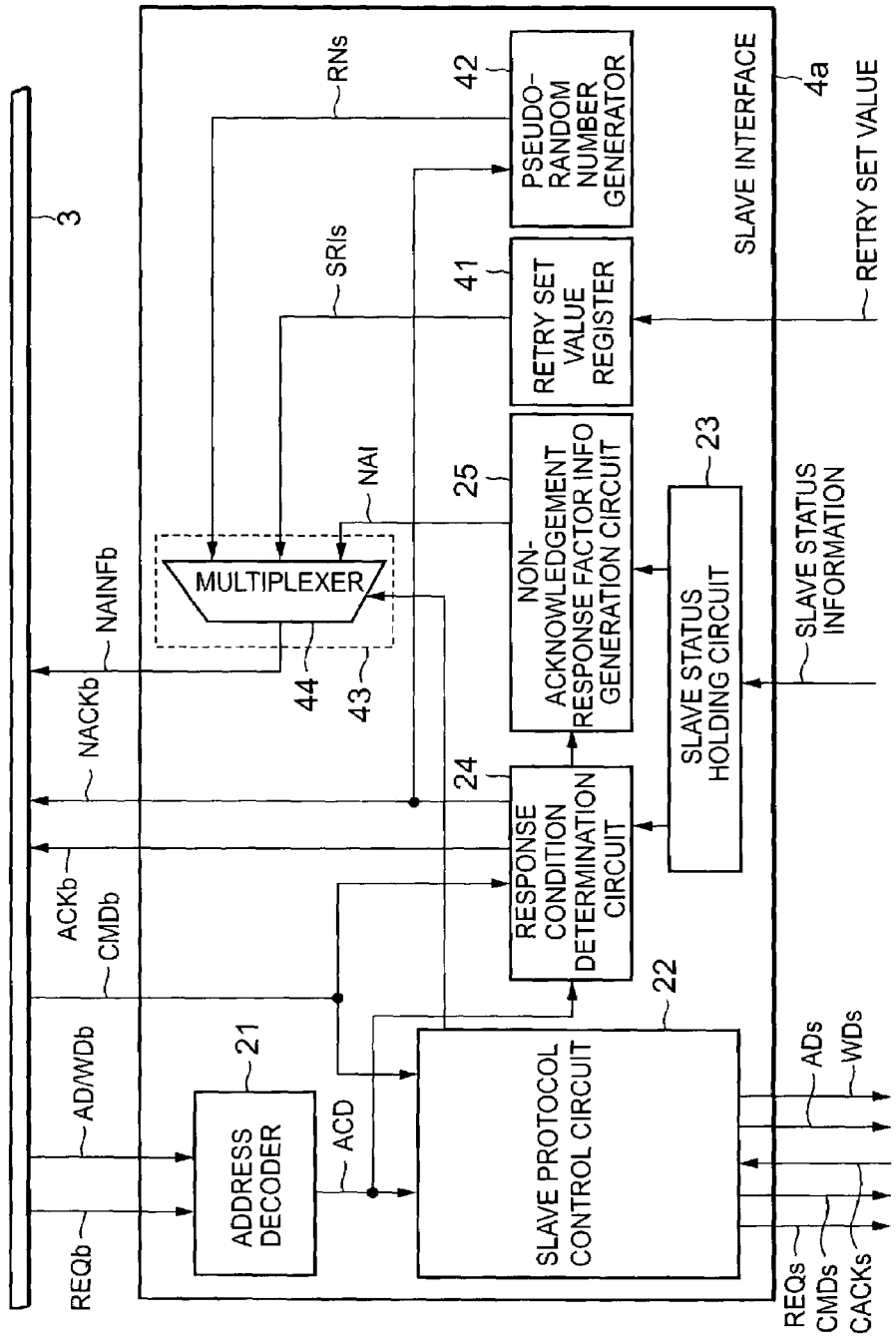
FIG. 2 is a block diagram of a slave interface of the first embodiment of the present invention.
Figure 3:
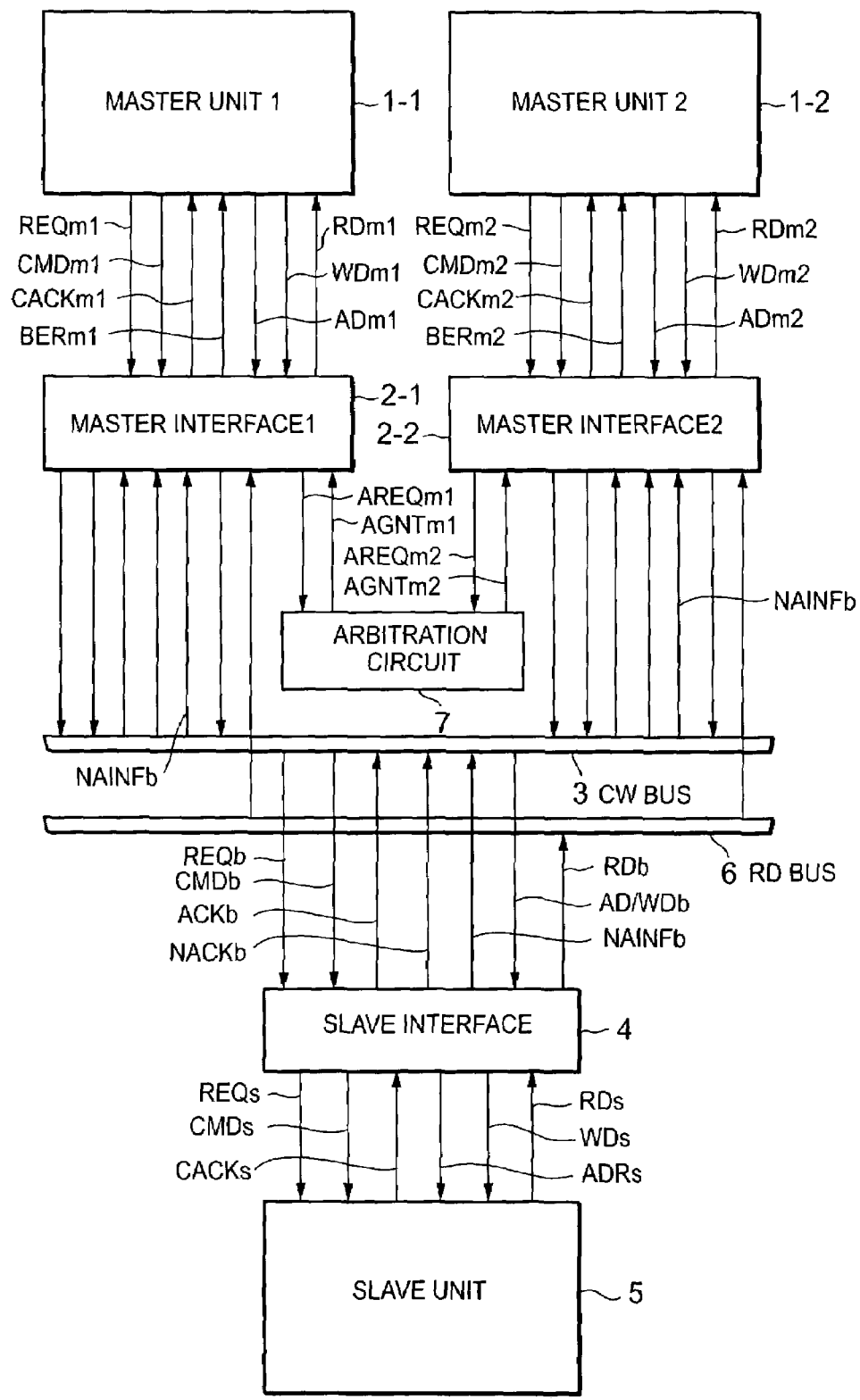
FIG. 3 is a diagram showing an example of a bus system of the present invention.

FIG. 1, FIG. 2, and FIG. 3 are diagrams that describe a first embodiment of a bus system of the present invention. In the first embodiment, a random number value is generated by the slave interface and added with the master interface. FIG. 1 is a block diagram of the master interface, FIG. 2 is a block diagram of the slave interface, and FIG. 3 is a diagram showing an example of a bus system.

Figure 12:
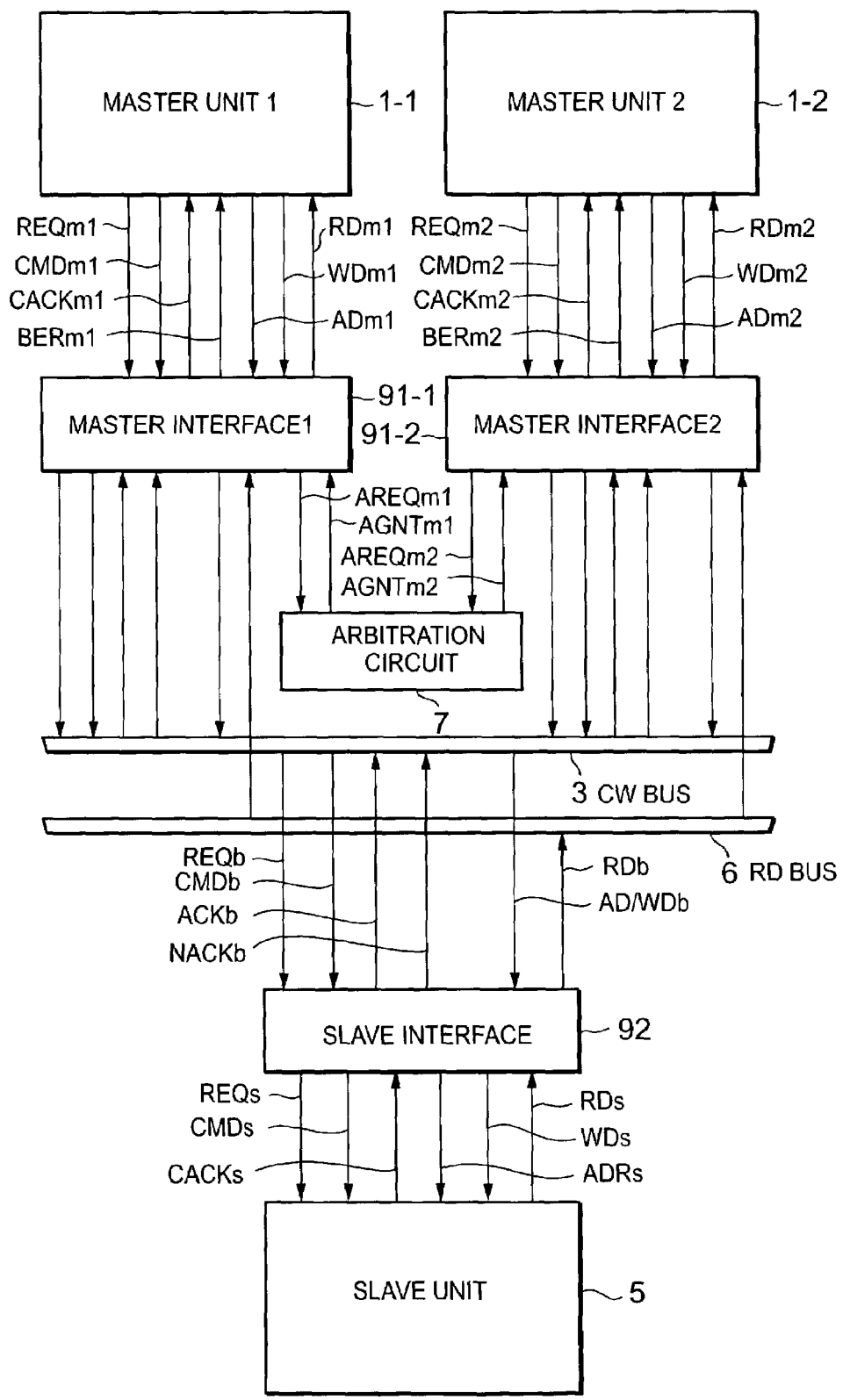
FIG. 12 is a diagram showing an example of a conventional bus system.
Figure 13:
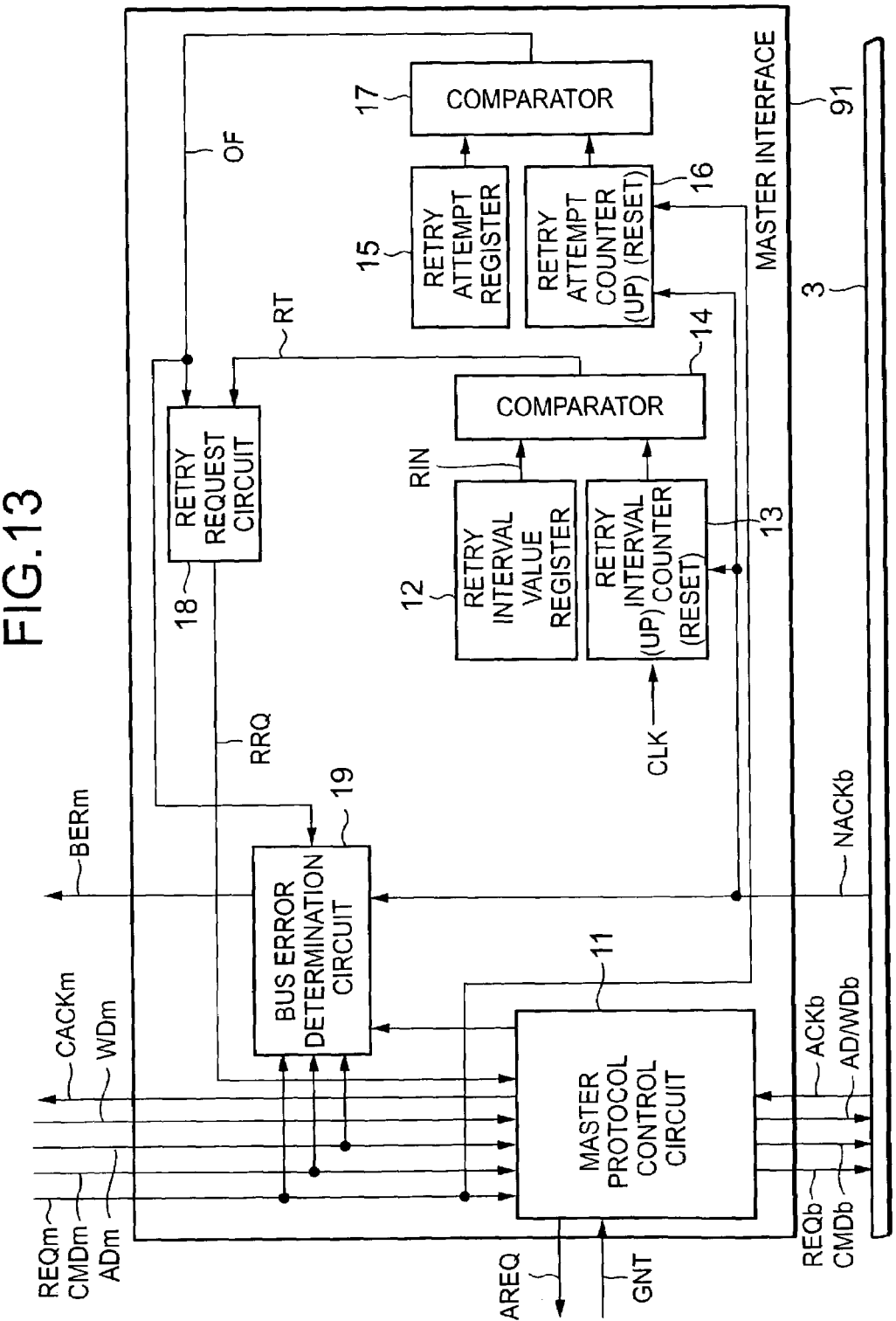
FIG. 13 is a block diagram showing a master interface in a conventional bus system.
Figure 14:
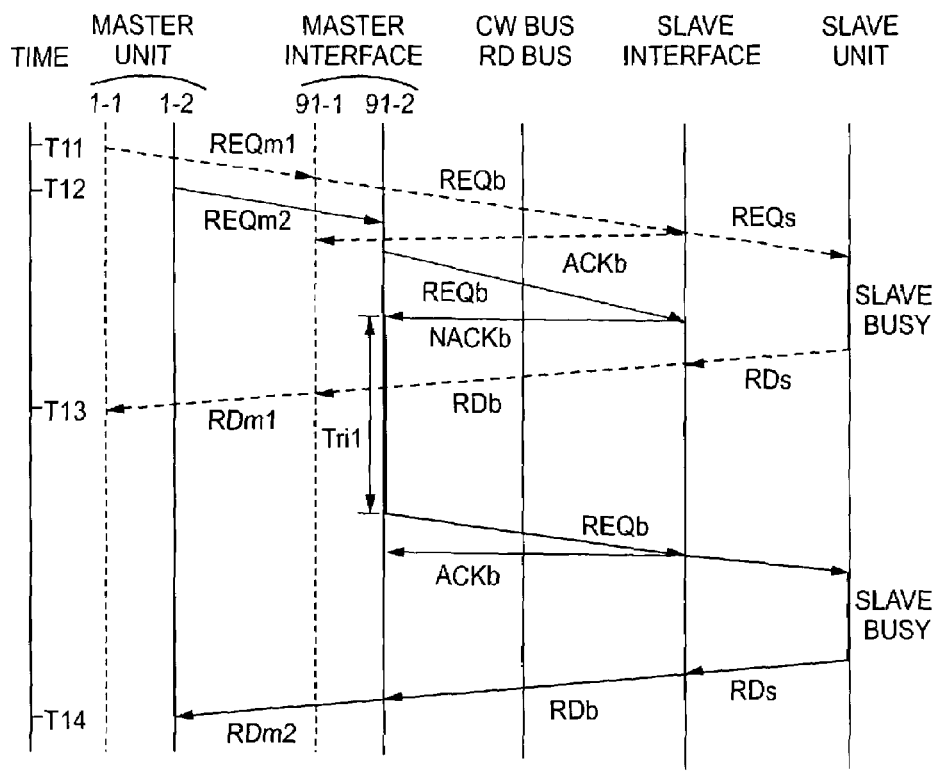
FIG. 14($a$) is an operational sequence chart and FIG. 14($b$) is an operational timing chart for a conventional bus system.
Figure 14:
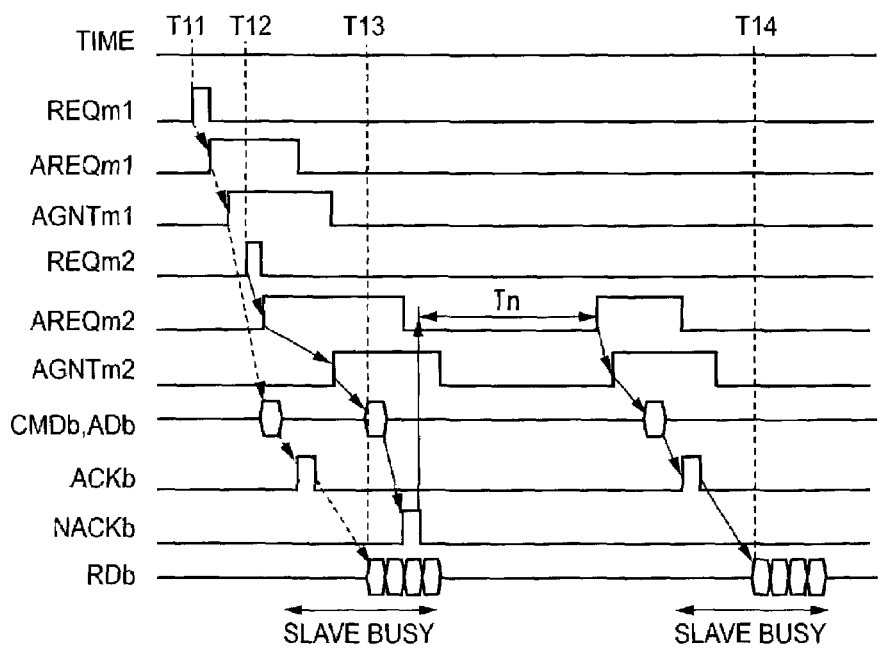

To begin with, the overall bus system is described while referencing FIG. 3. The bus system of the first embodiment provides a slave interface 4 that outputs non-acknowledgement response incidental information NAINFb in addition to input/output that is similar to that of the slave interface 92 in place of the slave interface 92 in the conventional bus system of FIG. 12. In addition, the bus system of the first embodiment provides master interfaces 2-1 and 2-2 that input non-acknowledgement response incidental information NAINFb in addition to input/output similar to that of the master interface 91 in place of the master interfaces 91-1 and 91-2. The configuration of the bus system is described forthwith.

A first master device including a master unit 1-1 and a master interface 2-1 and a second master device including a master unit 1-2 and a master interface 2-2 are connected to a CW bus 3 that transmits commands, addresses, write data, etc. In addition, a slave device including a slave unit 5 and a slave interface 4 is connected to the CW bus 3. Furthermore, the master interface 2-1 of the first master device, the master interface 2-2 of the second master device, and the slave interface 4 of the slave device are connected to a RD bus 6 that transmits read data.

A transmission request REQm1, command CMDm1, address ADm1, and write data WDm1 are sent from the master unit 1-1 of the first master device to the master interface 2-1. In the opposite direction—from the master interface 2-1 to the master unit 1-1—a command acknowledgement CACKm1 or bus error signal BERm1 is sent. The command acknowledgement CACKm1 gives notice that the master interface 2-1 has received the acknowledgement response ACKb from the slave device. In addition, a transmission request REQb, command CMDb, and address/write data AD/WDb are sent from the master interface 2-1 to the slave interface 4 of the slave device via the CW bus 3. In the opposite direction—from the slave interface 4 to the master interface 2-1 via the CW bus 3—an acknowledgement response ACKb, non-acknowledgement response NACKb, or non-acknowledgement response incidental information NAINFb is sent.

In the same manner, a transmission request REQm2, command CMDm2, address ADm2, and write data WDm2 are sent from the master unit 1-2 of the second master device to the master interface 2-2. In the opposite direction—from the master interface 2-2 to the master unit 1-2—a command acknowledgement CACKm2 or bus error signal BERm2 is sent. In addition, a transmission request REQb, command CMDb, and multiplexed address/write data AD/WDb are sent from the master interface 2-2 to the slave interface 4 of the slave device via the CW bus 3. In the opposite direction—from the slave interface 4 to the master interface 2-2 via the CW bus 3—an acknowledgement response ACKb, non-acknowledgement response NACKb, or non-acknowledgement response incidental information NAINFb is sent.

From the slave interface 4 of the slave device to the slave unit 5, a transmission request REQs, command CMDs, address ADs, and write data WDs are sent. In the opposite direction—from the slave unit 5 to the slave interface 4—a command acknowledgement CACKs is sent. The command acknowledgement CACKs gives notification that the slave unit 5 is able to receive the next command.

Read data is sent from the slave unit 5 to the slave interface 4 with the read data RDs. Read data RDb is sent from the slave interface 4 to the master interface 2-1 of the first master device or the master interface 2-2 of the second master device via the RD bus 6. In the first master device, read data RDm1 is sent from the master interface 2-1 to the master unit 1-1; and in the second master device, read data RDm2 is sent from the master interface 2-2 to the master unit 1-2.

An arbitration circuit 7 is provided to decide usage rights (access) for the CW bus 3. A bus access request AREQm1 is sent from the master interface 2-1 of the first master device to the arbitration circuit 7, and a bus access request AREQm2 is sent from the master interface 2-2 of the second master device to the arbitration circuit 7. If the arbitration circuit 7 is to give bus access for the CW bus 3 to the first master device, it sends a grant signal AGNTm1 to the master interface 2-1. If the arbitration circuit 7 is to give bus access for the CW bus 3 to the second master device, it sends a grand signal AGNTm2 to the master interface 2-2.

Next, FIG. 1 is described. FIG. 1 shows the internal block of the portion of the first embodiment related to the CW bus 3 of the master interface 2a, however, the portion related to the RD bus 6, or more specifically, the portion related to read data reception is omitted.

In the master interface 2a, a master protocol control circuit 11 receives transmission request REQm and command CMDm from the master unit 1 and controls communication between the master unit 1 and the slave device based on protocol. The retry information extraction circuit 31 extracts the retry set value SRI and the random number value RN from the non-acknowledgement response incidental information NAINFb transmitted by the slave interface 4a. If the retry set value SRI is coded, decoding is also performed. For example, in the case where the respective retry set values SRI of four slave devices are, in decimal numbers, 10, 50, 100, and 200, the slave device codes and sends out 10 as (00), 50 as (01), 100 as (10), and 200 as (11). The retry information extraction circuit 31 is provided with a decoder circuit (or a decoder comparison table), which decodes these to the respective original retry set values 10, 50, 100, and 200. In this example, in order to send the decimal numeral 200 as it is, 8 bits are necessary, however, if this is coded then it may be sent with only two bits. An adder 32 adds the retry set value SRI and the random number RN and outputs the retry interval value RIN.

The retry interval counting unit 33 counts the pulses of the clock CLK following reception of the non-acknowledgement response NACKb and when it is detected that the number of the retry interval value RIN has been reached, the retry time notification signal RT is made active level. The retry interval counting unit 33 is configured with, for example, a retry interval value register 12 that holds the retry interval value RIN; a retry interval counter 13 that counts the number of clock pulses by incrementing the count value each time a pulse of the clock CLK is input after the count value is reset upon receiving the non-acknowledgement response NACKb; and a comparator 14 that detects if the count value of the retry interval counter 13 matches the retry interval value RIN and makes the retry time alert signal RT active level. It is noted that the value set in the retry interval value register may be set as a value that is corrected by adding or subtracting a predetermined number $\alpha$ to the retry interval value RIN calculated to take into account variance due to the clock time employment from circuit activity such as adding.

The retry attempt counting unit 34 counts the number of times the non-acknowledgement response NACKb is received from the master unit 1 following reception of the transmission request REQm, and makes the overflow signal OF active level after detecting that the count value has become larger than the preset permissible retry count PRC. The retry attempt counting unit 34 is configured with, for example, a retry attempt register 15 that is stored in advance with a predetermined permissible retry count PRC, a retry attempt counter 16 that is incremented each time a non-acknowledgement response NACKb is received after the count value is reset due to the transmission request REQm from the master unit 1, and a comparator 17 that makes the overflow signal OF active level after detecting that the count value has become larger than the permissible retry count PRC in the retry attempt register 15.

In the case where the retry request circuit 18 detects that the retry time alert signal RT has changed to the active level when the overflow signal OF is at the inactive level, a retry activation request signal RRQ is sent to the master protocol control circuit 11. When the retry activation request signal RRQ is received, the master protocol control circuit 11 resends the transmission request REQb, command CMDb, and address (the address portion of the AD/WD). A bus error determination circuit 19a detects that the overflow signal OF has changed to the active level and outputs a bus error signal BERm. In addition, the bus error determination circuit 19a discerns the non-acknowledgement response factor information portion of the non-acknowledgement response incidental information NAINFb, and outputs a bus error signal BERm in cases where a retry is useless due to factors such as the command not being supported by the slave device.

Next, FIG. 2 is described. FIG. 2 shows the internal block of the portion of the first embodiment related to the CW bus 3 of the slave interface 4a, however, the portion related to the RD bus 6, or more specifically, the portion related to read data reception is omitted.

In the slave interface 4a, the address decoder 21 receives the transmission request REQb from the master unit 1 via the master interface 2a and the CW bus 3 and the address portion of the multiplexed address/write data AD/WD, and outputs an address condition detection signal ACD should the transmission request be for the slave unit 4a itself. A slave protocol control circuit 22 receives the address condition detection signal ACD and the command CMDb from the master device and controls communication between the master device and the slave unit 5 based on protocol.

A slave status holding circuit 23 inputs and holds slave status information that shows whether the slave unit 5 has a status ready for transmission request processing or a busy status not ready for processing. A response condition determination circuit 24 decides whether or not to respond to a transmission request REQb from the address condition detection signal ACD, command CMDb, and slave status information held in the slave status holding circuit 23, and outputs an acknowledgement response ACKb to the CW bus 3 when response is possible or outputs a non-acknowledgement response NACKb when response is not possible.

A non-acknowledgement response factor information generation circuit 25 references the slave status information held in the slave status holding circuit 23 to generate information regarding factors causing the non-acknowledgement response NACKb to be returned. For example, information such as the slave unit being in a busy state or the received command not being supported by the slave device is coded and generated.

A retry set value register 41, which is a retry set value storage circuit, stores the retry set value SRIs that is uniquely set for the slave unit. In the case where the retry set value is coded and sent from the slave unit, the retry set value SRIs is stored in the coded format.

A pseudo-random number generator 42 activates a predetermined signal to generate a pseudo-random number. In FIG. 2, the non-acknowledgement response NACKb is used as the predetermined signal, however, the address condition detection signal ACD that is output by the address decoder 21 may be used in place of the non-acknowledgement response NACKb. As generation of the random number RNs may occur before the non-acknowledgement response NACKb is sent out from the response condition determination circuit 24, use of the address condition detection signal ACD is more favorable since high speed operation is not required of the pseudo-random number generator 42. When the response determination result is the acknowledgement response ACKb, the generated random number RNs is immediately discarded.

The non-acknowledgement response factor information generation circuit 43 follows when the non-acknowledgement response NACKb is output and multiplexes the non-acknowledgement response factor information NAI, retry set value SRIs and random number RNs to generate and output the non-acknowledgement response incidental information NAINFb to the CW bus 3. The non-acknowledgement response factor information generation circuit 43 is configured using, for example, a multiplexer 44 that performs selective output control with a slave protocol control device. With the transmission of the non-acknowledgement response incidental information NAINF, the non-acknowledgement response factor information NAI, retry set value SRIs, and random number RNs are transferred through a single signal line or a signal line group in order according to the sequence set with the slave protocol control circuit 22.

In addition, the non-acknowledgement response factor information NAI, retry set value SRIs, and random number RNs configuring the non-acknowledgement response incidental information NAINF may be individually transferred through a plurality of explicit signal lines or a signal line group; and when configured in this manner, the non-acknowledgement response factor information generation circuit 43 may be omitted.

Figure 4:
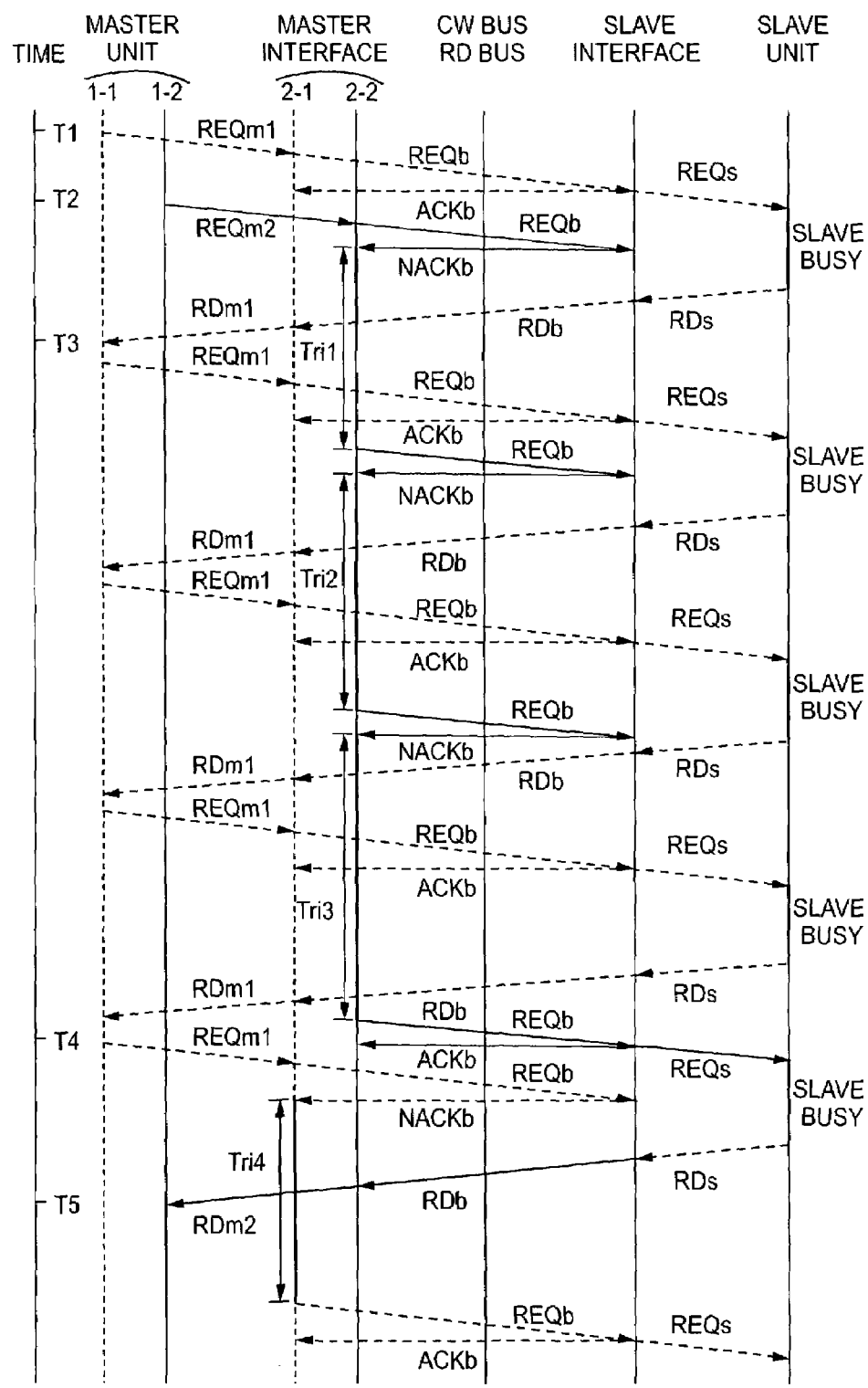
FIG. 4 is an operational sequence chart of the first embodiment.
Figure 15:
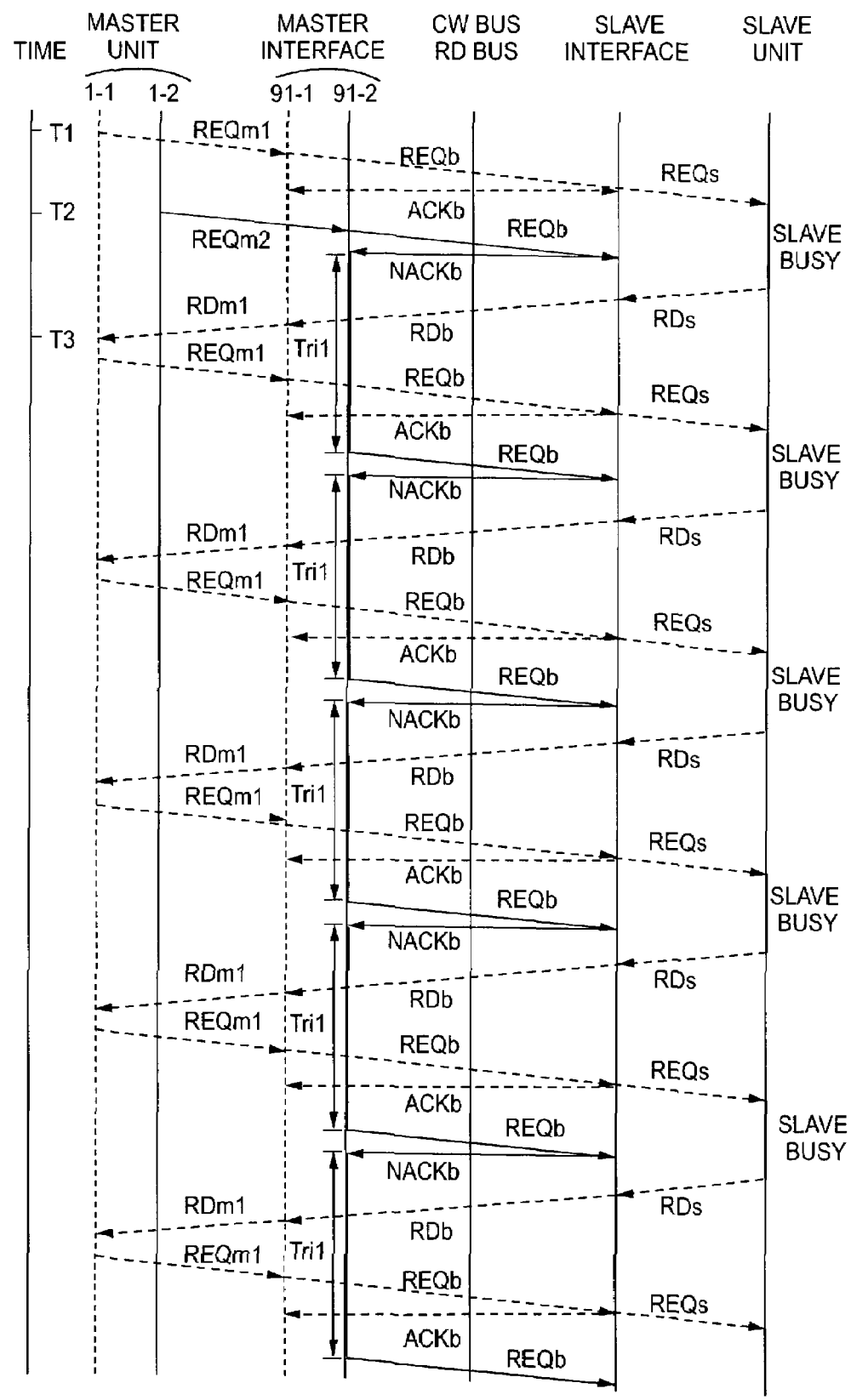
FIG. 15 is an operational sequence chart illustrating an incidence of live-lock.

Next, operation of the first embodiment of the present invention is described while referencing FIGS. 1, 2, 3, and 4. FIG. 4 is an operational sequence chart of the first embodiment. As with the case in FIG. 15 where live-lock develops in the conventional example, an example is described with the case where the transmission request REQb is periodically generated from the master unit 1-1 to the slave unit 5, and this is initially set so as to match the period of the transmission request REQb generated based on the retry interval value RIN by the master unit 1-2.

At time point T1, a transmission request REQm1 from the master unit 1-1 to the master interface 2-1 is generated. At the same time, the address ADm1, command CMDm1, etc. are delivered to the master interface 2-1.

The master interface 2-1 makes a request for bus access to the arbitration circuit 7, and if bus access is granted and the CW bus 3 is not in use, the transmission request REQb is sent out over the CW bus 3. At the same time the multiplexed address/write data AD/WDb and command CMDb are output to the CW bus 3. The retry attempt counter 16 of the master interface 2-1 is reset to zero.

The address decoder 21 within the slave interface 4 decodes the address portion of the address/write data AD/WD, and when it is the actual slave device designated by the address, the slave interface 4 imports the transmission request REQb, address/write data AD/WDb, and command CMDb from the CW bus 3.

With the response condition determination circuit 24 of the slave interface 4, it is determined whether to accept or reject the transmission request REQb from the master unit 1-1 in accordance with the received command CMDb and the status of the slave unit 5 being held in the slave status holding circuit 23. As it is determined to be in a reception ready state in FIG. 4, the acknowledgement response ACKb is output over the CW bus 3 and also the transmission request REQb is transmitted to the slave unit 5.

Upon receiving the acknowledgement response ACKb, the master interface 2-1 sends a command acknowledgement CACKm1 to the master unit 1-1 (see FIG. 3). At the same time, data phase transmission commences. With the data phase, in the case where it is a write-operation, the master interface 2-1 makes a request for write data to the master unit 1-1 and outputs the received data to the CW bus 3, however, this case in FIG. 4 is a read-operation so the master interface releases the CW bus 3 and waits a predetermined length of time until the read data is prepared.

Meanwhile, at time point T2, it is assumed that a transmission request REQm2 is sent from the master unit 1-2 to the master interface 2-2. At the same time, the address ADm2, command CMDm2, etc. are delivered to the master interface 2-2.

The master interface 2-2 makes a request for CW bus 3 bus access to the arbitration circuit 7, waits until it is accessible since it is in use, and then once bus access is granted, sends the transmission request REQb over the CW bus 3. The retry attempt counter 16 of the master interface 2-2 is reset to zero.

The address decoder 21 within the slave interface 4 decodes the address portion of the address/write data AD/WD, and when it detects that it itself is the slave device designated by the address, the slave interface 4 imports the transmission request REQb, address/write data AD/WDb, and command CMDb from the master unit 1-2 via the CW bus 3.

With the response condition determination circuit 24 of the slave interface 4, it is determined whether to accept or reject the transmission request REQb from the master unit 1-1 in accordance with the received command CMDb and the status of the slave unit 5 held in the slave status holding circuit 23. Nevertheless, since the slave unit 5 is busy with processing the transmission request from the master unit 1-2, the response condition determination circuit 24 within the slave interface 4 decides to reject the transmission request REQb from the master unit 1-2 and returns a non-acknowledgement response NACKb via the CW bus 3. In addition, non-acknowledgement response incidental information NAINFb is output to the CW bus 3 from the non-acknowledgement response factor information generation circuit 43. The non-acknowledgement response factor information NAI, retry set value SRI, and random number RN (the first attempt is called random number RN1) are included in this non-acknowledgement response incidental information NAINFb of the first attempt.

Upon reception of the non-acknowledgement response NACKb and the non-acknowledgement response incidental information NAINFb, the master interface 2-2, increases the count of the retry attempt counter 16 and determines whether or not it is greater than the permissible retry count PRC stored in the retry attempt register 15. Since the count value of the retry attempt counter is 1, the overflow signal holds the inactive level.

In addition, with the master interface 2-2, the retry set value SRI and the random number RN (the random number RN1 of the first attempt) are extracted with the retry information extraction circuit 31 from the non-acknowledgement response incidental information NAINFb of the first attempt and added with the adder 32, and then the retry interval value RIN (in the first attempt, the retry interval value RIN1=SRI+RN1) is calculated and stored in the retry interval value register 12. It should be noted that bus usage rights (access) is abandoned. The count value of the retry interval counter 13 is reset to zero with the non-acknowledgement response NACKb and thereafter incremented with every clock pulse.

Meanwhile, the read data RDm1 corresponding to the transmission request of the master unit 1-1 is transmitted at time point T3 from the slave unit 5 to the master unit 1-1 via the RD bus 6 and read processing is completed. Immediately afterwards, since the master unit 1-1 transmits the next transmission request REQm1, the transmission request is received and the slave unit 5 becomes busy again.

With the master interface 2-2, if the count value of the retry interval counter 13 becomes equal to that of the first attempt retry interval value RIN1 stored in the retry interval value register 12, then the retry interval time Tri1 of the first attempt is assumed to have elapsed, the retry time notification signal RT is sent from the comparator 14 to the retry request circuit 18, the retry activation request signal RRQ is output, and the transmission request REQb is resent from the master protocol control circuit 11 to the slave interface 4.

However, the transmission request REQb that is resent from the master interface 2-2 is rejected because the slave unit 5 is busy, and the non-acknowledgement response NACKb and the non-acknowledgement response incidental information NAINFb of the second attempt are sent. The non-acknowledgement response factor information NAI, retry set value SRI, and random number RN (the second attempt is called random number RN2) are included in this non-acknowledgement response incidental information NAINFb of the second attempt. The master interface 2-2 stores the retry interval value RIN2 (=SRI+RN2) of the second attempt in the retry interval value register 12, receives the non-acknowledgement response NACKb, and again begins clocking of the retry interval time Tri2 of the second attempt.

In the case where the random number RN1 of the first attempt and the random number RN2 of the second attempt are different values, the retry interval time Tri2 of the second attempt will be a time that is different from the retry interval time Tri1 of the first attempt. Even in the case where the retry interval time Tri1 of the first attempt matches the send period of the transmission request from the master unit 1-1, since the retry interval time Tri2 of the second attempt is set (pseudo as it may be) independent of the retry interval time Tri1 of the first attempt, there is a high probability that it will differ from the retry interval time Tri1 of the first attempt. Moreover, since the retry interval times of the third and subsequent attempts are determined independent of the retry interval times of all of the previous attempts, it may be easily understood that it is substantially impossible for a condition where the retry interval time of the master interface 2-2 and the send period of a transmission request from the master unit 1-1 match to continue for a long length of time. Accordingly, with this embodiment, development of live-lock is prevented, and in addition, even if it should fall into a live-lock situation, this may be resolved.

FIG. 4 is an example where the retry interval time is generated with Tri1<Tri2<Tri3. At time point T4 the acknowledgement response ACKb from the slave interface 4 corresponding to the transmission request REQb from the master interface 2-2 following the retry time interval Tri3 of the third attempt is returned, and at time point T5 the read data RDm2 corresponding to the read transmission request from the master unit 1-2 is received by the master unit 1-2.

Thus, with this embodiment, development of live-lock is prevented, and in addition, even if it should fall into a live-lock situation, this may be resolved. In addition, since the retry set value SRI used has a value that is uniquely set for the slave device and sent from the slave device to which the transmission request has been made, even in the case where various slave devices having widely varying transmission preparation times connected to the bus, the retry interval time may be set within a range that is appropriate for the respective slave devices.

In addition, for example if the retry set value is given as 8 bits and the random number to be generated is given as 4 bits, the pseudo-random number generator may be configured with a 4 bit flip-flop and exclusive OR gates, and since the adder may be that which is capable of adding an 8 bit retry set value and a 4 bit random number, there is only a small amount of hardware that need to be added to configure this embodiment. In particular, in the case where multiple types of slave units are connected to the bus, the amount of hardware that is added is significantly less than the bus system that uses the technique described in Japanese Patent Application Laid-open No. Hei 9-114750.

Furthermore, the side effect where the bus is monopolized for a long time by a particular master device and other master devices are unable to use the bus, as with the case where live-lock is avoided using the technique described in Japanese Patent Application Laid-open No. 2000-250850, does not occur.

It should be noted that in FIG. 1, the retry interval counting unit 33 is configured with the retry interval register 12, the retry interval counter 13, and the comparator 14. In place of the retry interval counter 13, however, a retry interval value from the adder 32 may be preset when the non-acknowledgement response NACKb is received and a decrementing retry interval counter provided that decrements with every clock pulse, and then in place of the comparator 14, a zero comparator may be provided to detect when the count value of the decrement counter has reached zero and output a retry time notification signal RT. By configuring the retry interval counting unit 33 in this manner, the retry interval value register becomes unnecessary and the circuitry for the zero comparator may be simplified.

In the same manner, in FIG. 1, the retry attempt counting unit 34 is configured with the retry attempt register 15, the retry attempt counter 16, and the comparator 17. In place of the retry attempt counter 16, [NOTE: ERROR CORRECTION] however, a value that has "1" added to the predetermined permissible retry count PRC when a transmission request REQm from the master unit is received may be preset, and a decrementing retry attempt counter provided that decrements each time the non-acknowledgement response NACKb is received. Then in place of the comparator 17, a zero comparator may be provided to detect when the count value of the decrement counter has reached zero and output an overflow signal OF. By configuring the retry attempt counting unit 34 in this manner, the retry attempt register becomes unnecessary and the circuitry for the zero comparator may be simplified.

Figure 5:
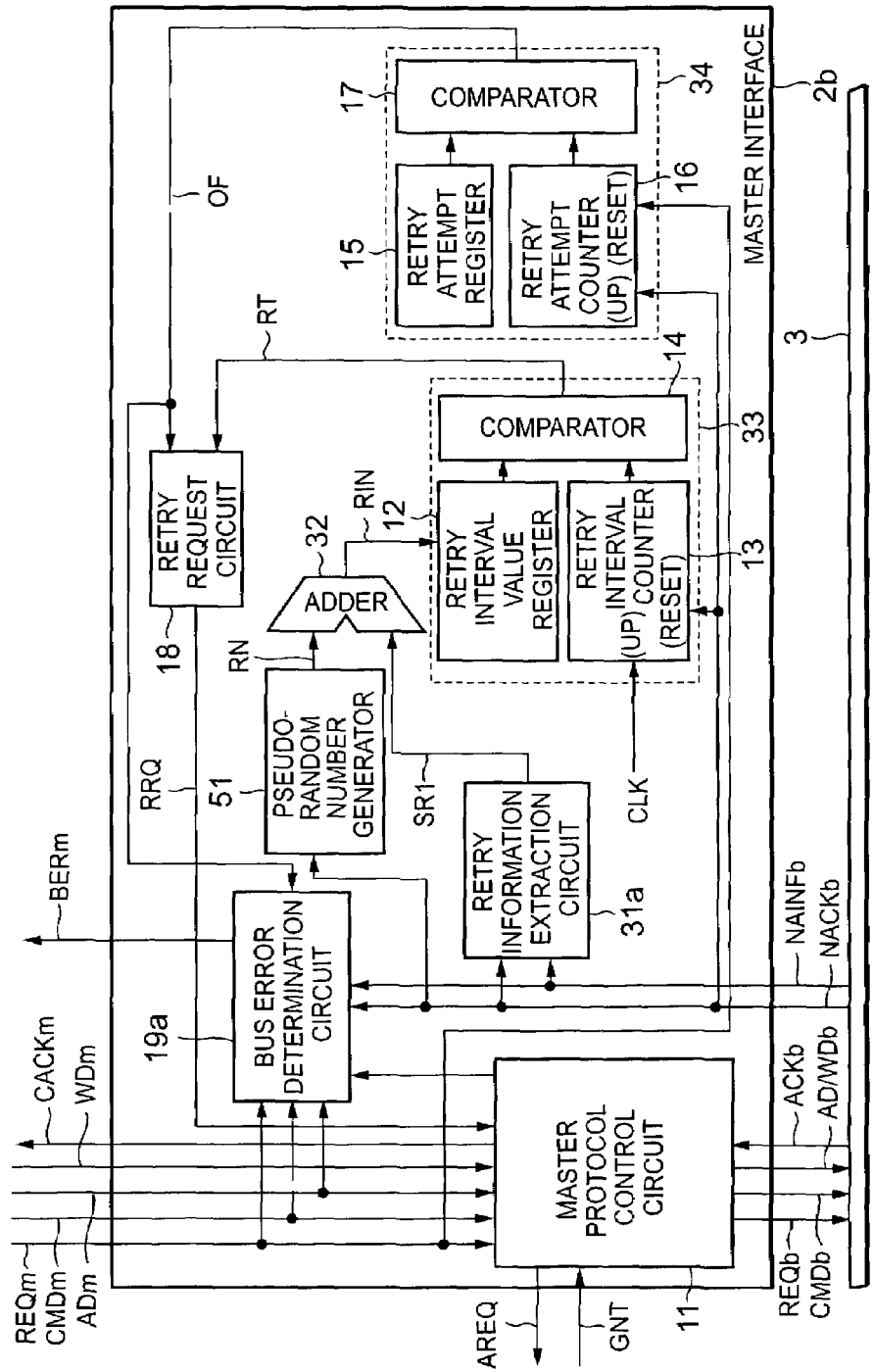
FIG. 5 is a block diagram of a master interface of the second embodiment of the present invention.
Figure 6:
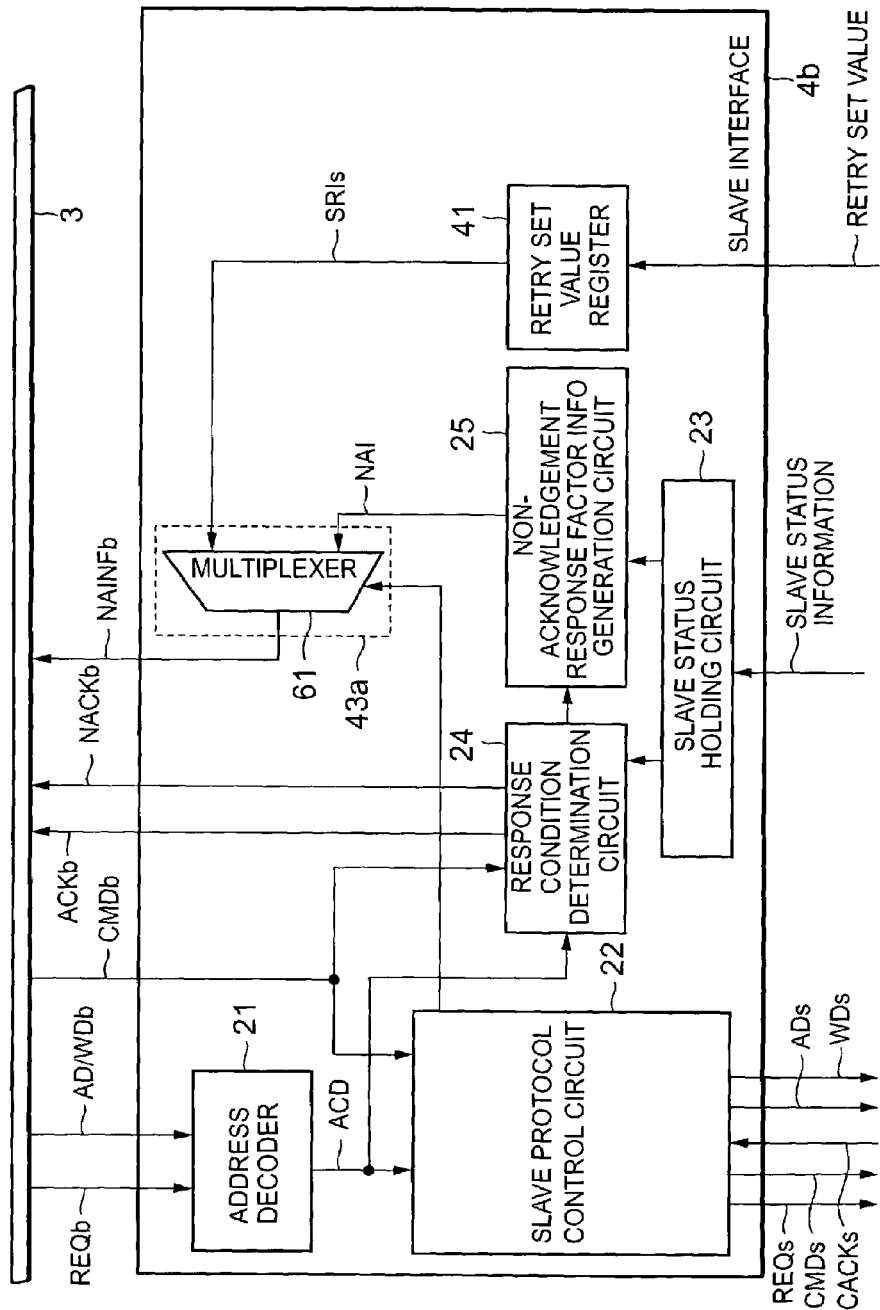
FIG. 6 is a block diagram of a slave interface of the second embodiment of the present invention.

Next, the second embodiment of the present invention is described. FIG. 5 is a block diagram of a master interface 2b of the bus system of the second embodiment and FIG. 6 is a block diagram of a slave interface 4b of the bus system of the second embodiment. The configuration of the overall bus system is similar to that in FIG. 3 of the first embodiment; however, in the second embodiment, pseudo-random number generation and adding with the retry set value is performed within the master interface 2b.

In the master interface 4b of FIG. 5, a master protocol control circuit 11 receives a transmission request and command from the master unit 1 and controls communication between the master unit 1 and the slave device based on protocol. The retry information extraction circuit 31a extracts the retry set value SRI from the non-acknowledgement response incidental information NAINFb transmitted by the slave interface 4b. In the case where the retry set value SRI is coded, decoding is performed in the same manner as with the retry information extraction circuit 31 of the first embodiment of FIG. 1.

The pseudo-random number generator 51 receives a predetermined signal and then generates and outputs the random number RN. It should be noted that with FIG. 5, the non-acknowledgement response NACKb is used as the predetermined signal, however, the transmission request REQb output from the master protocol control circuit 11 to the CW bus may be used instead of the non-acknowledgement response NACKb. As generation of the random number RNs may occur before the non-acknowledgement response NACKb is received, use of the transmission request REQb is more favorable since high speed operation is not required of the pseudo-random number generator 51. When the acknowledgement response ACKb is received, the generated random number is immediately discarded. An adder 32 adds the retry set value SRI and the random number RN, and calculates and outputs the retry interval value RIN.

The retry interval counting unit 33 counts the pulses of the clock CLK following reception of the non-acknowledgement response NACKb and when it is detected that the number of the retry interval value RIN has been reached, the retry time notification signal RT is made active level. The retry interval counting unit 33 is configured with, for example, a retry interval value register 12 that holds the retry interval value RIN; a retry interval counter 13 that counts the number of clock pulses by incrementing the count value each time a pulse of the clock CLK is input after the count value is reset upon receiving the non-acknowledgement response NACKb; and a comparator 14 that detects if the count value of the retry interval counter 13 matches the retry interval value RIN and makes the retry time alert signal RT active level.

The retry attempt counting unit 34 counts the number of times the non-acknowledgement response NACKb is received following reception of the transmission request REQm from the master unit 1, and makes the overflow signal OF active level after detecting that the count value has become larger than the preset permissible retry count PRC. The retry attempt counting unit 34 is configured with, for example, a retry attempt register 15 that is stored in advance with a predetermined permissible retry count PRC, a retry attempt counter 16 that is incremented each time a non-acknowledgement response NACKb is received after the count value is reset due to the transmission request REQm from the master unit 1, and a comparator 17 that makes the overflow signal OF active level after detecting that the count value has become larger than the permissible retry count PRC in the retry attempt register 15.

In the case where the retry request circuit 18 detects that the retry time alert signal RT has changed to the active level when the overflow signal OF is at the inactive level, a retry activation request signal RRQ is sent to the master protocol control circuit 11. When the retry activation request signal RRQ is received, the master protocol control circuit 11 resends the transmission request REQb, command CMDb, and address (the address portion of the AD/WD). A bus error determination circuit 19a detects that the overflow signal OF has changed to the active level and outputs a bus error signal BERm. In addition, the bus error determination circuit 19a discerns the non-acknowledgement response factor information portion of the non-acknowledgement response incidental information NAINFb NOTE: ERROR CORRECTION, and outputs a bus error signal BERm in cases where a retry is useless due to factors such as the command not being supported by the slave device.

Next, FIG. 6 is described. In the slave interface 4b, the address decoder 21 receives the transmission request REQb from the master unit 1 and the address portion of the multiplexed address/write data AD/WD via the master interface 2b and the CW bus 3, and outputs an address condition detection signal ACD should the transmission request be for the slave unit 4b itself. A slave protocol control circuit 22 receives the address condition detection signal ACD and the command CMDb from the master device, and controls communication between the master device and the slave unit 5 based on protocol.

A slave status holding circuit 23 inputs and holds slave status information that shows whether the slave unit 5 has a status ready for transmission request processing or a busy status not ready for processing. A response condition determination circuit 24 decides whether or not to respond to a transmission request REQb from the address condition detection signal ACD, command CMDb, or slave status information held in the slave status holding circuit 23, and outputs an acknowledgement response ACKb to the CW bus 3 when response is possible or outputs a non-acknowledgement response NACKb when response is not possible.

A non-acknowledgement response factor information generation circuit 25 references the slave status information held in the slave status holding circuit 23 to generate information regarding factors causing the non-acknowledgement response NACKb to be returned.

A retry set value register 41, which is a retry set value storage circuit, stores the retry set value SRIs that is uniquely set for the slave unit. In the case where the retry set value is coded and sent from the slave unit, storage of the retry set value SRIs in coded format is the same as with the retry set value register 41 of the first embodiment in FIG. 2.

The non-acknowledgement response factor information generation circuit 43a follows when the non-acknowledgement response NACKb is output and multiplexes the non-acknowledgement response factor information NAI and retry set value SRIs to generate and output the non-acknowledgement response incidental information NAINFb to the CW bus 3. The non-acknowledgement response factor information generation circuit 43a is configured using, for example, a multiplexer 61 that performs selective output control with a slave protocol control device. With the transmission of the non-acknowledgement response incidental information NAINF, the non-acknowledgement response factor information NAI and retry set value SRIs are transferred through a single signal line or a signal line group in order according to the sequence set with the slave protocol control circuit 22.

In addition, the non-acknowledgement response factor information NAI and retry set value SRIs configuring the non-acknowledgement response incidental information NAINF may be individually transferred through a plurality of explicit signal lines or a signal line group; and when configured in this manner, the non-acknowledgement response factor information generation circuit 43a may be omitted.

With the second embodiment, the non-acknowledgement response incidental information NAINFb including the retry set value SRI from the slave interface 4b is sent to the master interface 2b, and then the random number RN generated by the pseudo-random number generator 51 within the master interface 2b and the retry set value SRI extracted from the non-acknowledgement response incidental information NAINFb are added to determine the length of the retry interval time until the transmission request REQb is to be resent based on the calculated retry interval value RIN. With this second embodiment as well, since the point that the retry set value SRI and the random number RN are added to give the retry interval value RIN is the same as with the first embodiment, the development of live-lock may be prevented, and even if it should fall into a live-lock situation, this may be resolved. In addition, since the retry set value SRI used has a value that is uniquely set for the slave device and sent from the slave device to which the transmission request has been made, even in the case where various slave devices having widely varying transmission preparation times are connected to the bus, the retry interval time may be set within a range that is appropriate for the respective slave devices.

With the second embodiment, since the pseudo-random number generator and adder are only in the master interface, in a bus system with a configuration where there are few master devices and many slave devices, the amount of additional hardware may be kept smaller than with even the first embodiment.

Figure 7:
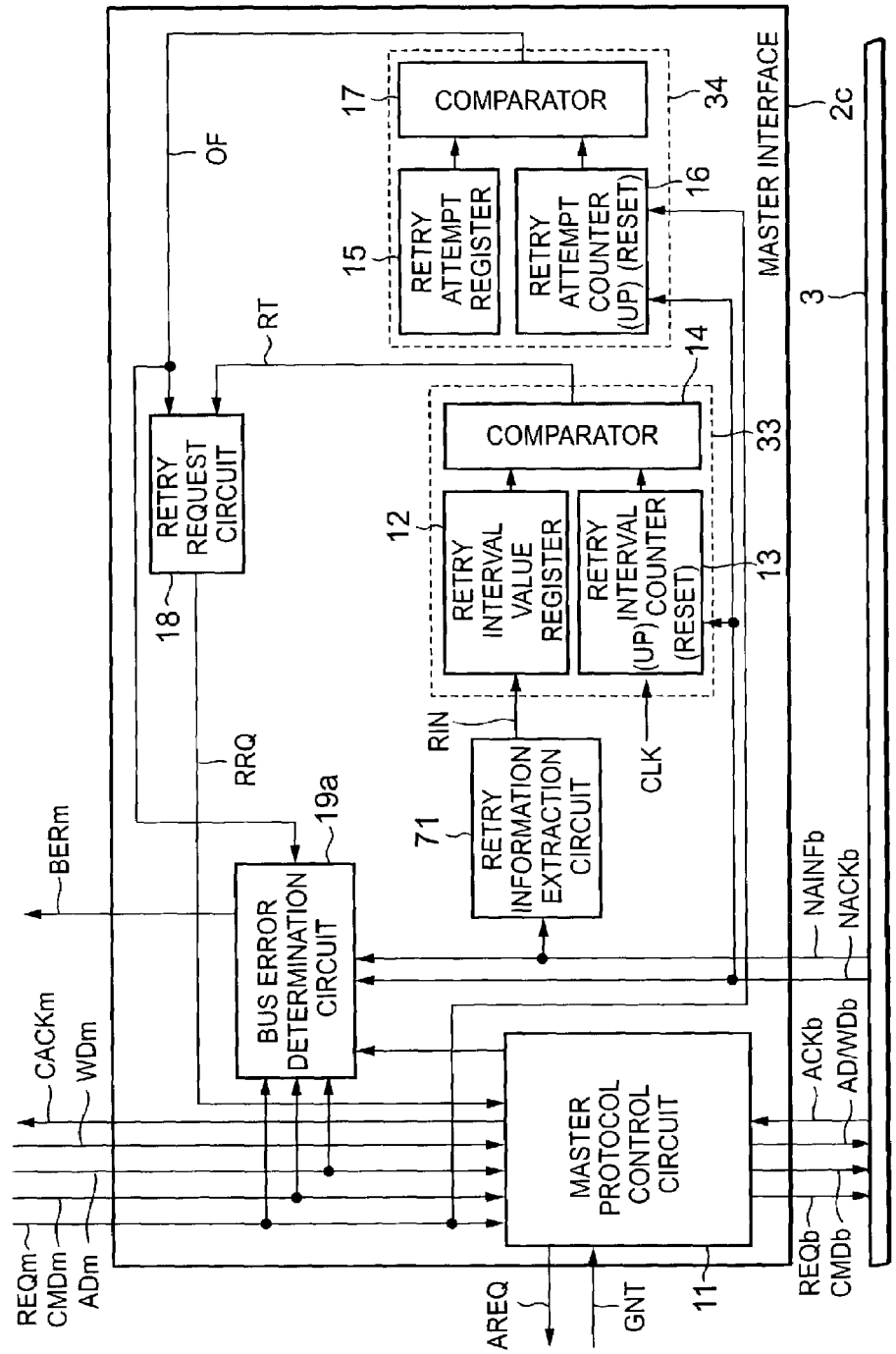
FIG. 7 is a block diagram of a master interface of the third embodiment of the present invention.
Figure 8:
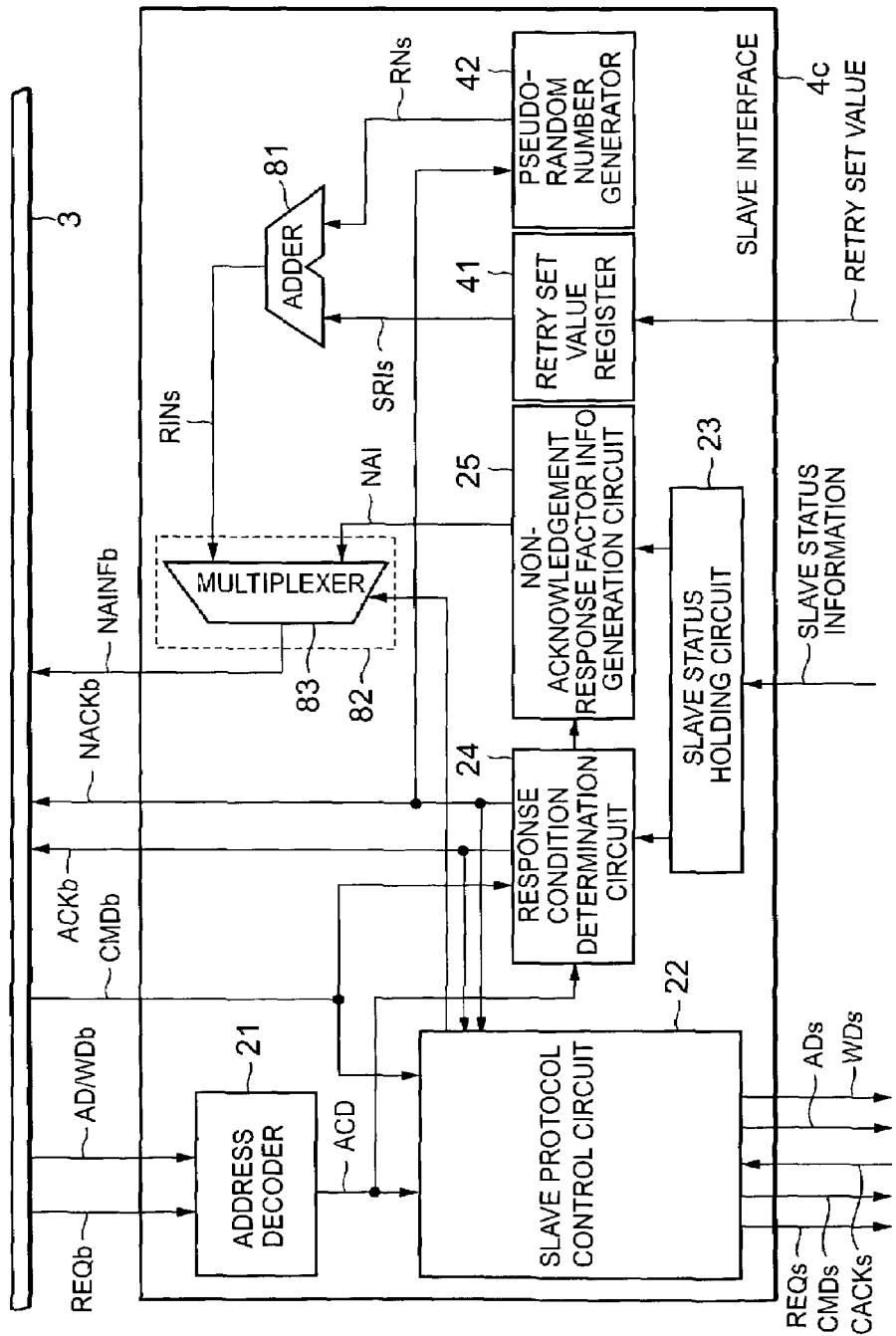
FIG. 8 is a block diagram of a slave interface of the third embodiment of the present invention.

Next, the third embodiment of the present invention is described. FIG. 7 is a block diagram of a master interface 2c of the bus system of the third embodiment and FIG. 8 is a block diagram of a slave interface 4c of the bus system of the third embodiment. While the overall configuration of the bus system is the same as FIG. 3 of the first embodiment, in the third embodiment, the random number is generated, the retry set value is added, and the retry interval value is calculated within the slave interface 4c, and the retry interval value is sent to the master interface 2c.

In the master interface 4c of FIG. 7, a master protocol control circuit 11 receives the transmission request and command from the master unit 1 and controls communication between the master unit 1 and the slave device based on protocol. The retry information extraction circuit 71 extracts the retry interval value RIN from the non-acknowledgement response incidental information NAINFb transmitted by the slave interface 4c.

The retry interval counting unit 33 counts the pulses of the clock CLK following reception of the non-acknowledgement response NACKb and when it is detected that the number of the retry interval value RIN has been reached, the retry time notification signal RT is made active level. The retry interval counting unit 33 is configured with, for example, a retry interval value register 12 that holds the retry interval value RIN; a retry interval counter 13 that counts the number of clock pulses by incrementing the count value each time a pulse of the clock CLK is input after the count value is reset upon receiving the non-acknowledgement response NACKb; and a comparator 14 that detects if the count value of the retry interval counter 13 matches the retry interval value RIN and makes the retry time alert signal RT active level.

The retry attempt counting unit 34 counts the number of times the non-acknowledgement response NACKb is received from the master unit 1 following reception of the transmission request REQm, and makes the overflow signal OF active level after detecting that the count value has become larger than the preset permissible retry count PRC. The retry attempt counting unit 34 is configured with, for example, a retry attempt register 15 that is stored in advance with a predetermined permissible retry count PRC, a retry attempt counter 16 that is incremented each time anon-acknowledgement response NACKb is received after the count value is reset due to the transmission request REQm from the master unit 1, and a comparator 17 that makes the overflow signal OF active level after detecting that the count value has become larger than the permissible retry count PRC in the retry attempt register 15.

In the case where the retry request circuit 18 detects that the retry time alert signal RT has changed to the active level when the overflow signal OF is at the inactive level, a retry activation request signal RRQ is sent to the master protocol control circuit 11. When the retry activation request signal RRQ is received, the master protocol control circuit 11 resends the transmission request REQb, command CMDb, and address (the address portion of the AD/WD). A bus error determination circuit 19a detects that the overflow signal OF has changed to the active level and outputs a bus error signal BERm. In addition, the bus error determination circuit 19a discerns the non-acknowledgement response factor information portion of the non-acknowledgement response incidental information NAINFb, and outputs a bus error signal BERm in cases where a retry is useless due to factors such as the command not being supported by the slave device.

Next, FIG. 8 is described. In the slave interface 4c, the address decoder 21 receives the transmission request REQb from the master unit 1 via the master interface 2c and the CW bus 3 and the address portion of the multiplexed address/write data AD/WD, and outputs an address condition detection signal ACD should the transmission request be for the slave unit 4c itself. A slave protocol control circuit 22 receives the address condition detection signal ACD and the command CMDb from the master device and controls communication between the master device and the slave unit 5 based on protocol.

A slave status holding circuit 23 inputs and holds slave status information that shows whether the slave unit 5 has a status ready for transmission request processing or a busy status not ready for processing. A response condition determination circuit 24 decides whether or not to respond to a transmission request REQb from the address condition detection signal ACD, command CMDb, and slave status information held in the slave status holding circuit 23, and outputs an acknowledgement response ACKb to the CW bus 3 when response is possible or outputs a non-acknowledgement response NACKb when response is not possible.

A non-acknowledgement response factor information generation circuit 25 references the slave status information held in the slave status holding circuit 23 to generate information regarding factors causing the non-acknowledgement response NACKb to be returned.

A retry set value register 41, which is a retry set value storage circuit, stores the retry set value SRIs that is uniquely set for the slave unit. With the third embodiment, a real numeric value is used for the retry set value SRIs-a coded value is not used.

A pseudo-random number generator 42 activates a predetermined signal to generate a random number RNs. In FIG. 8, the non-acknowledgement response NACKb is used as the predetermined signal, however, the address condition detection signal ACD that is output by the address decoder 21 may be used in place of the non-acknowledgement response NACKb. As generation of the random number RNs may occur before the non-acknowledgement response NACKb is sent out from the response condition determination circuit 24, use of the address condition detection signal ACD is more favorable since high speed operation is not required of the pseudo-random number generator 42. An adder 81 adds the retry set value SRIs and the random number RNs and generates the retry interval value RINs.

The non-acknowledgement response factor information generation circuit 82 follows when the non-acknowledgement response NACKb is output and multiplexes the non-acknowledgement response factor information NAI and retry interval value RINs to generate and output the non-acknowledgement response incidental information NAINFb to the CW bus 3. The non-acknowledgement response factor information generation circuit 82 is configured using, for example, a multiplexer 83 that performs selective output control with a slave protocol control device. With the transmission of the non-acknowledgement response incidental information NAINF, the non-acknowledgement response factor information NAI and retry interval value RINs are transferred through a single signal line or a signal line group in order according to the sequence set with the slave protocol control circuit 22.

In addition, the non-acknowledgement response factor information NAI and retry interval value RINs configuring the non-acknowledgement response incidental information NAINF may be individually transferred through a plurality of explicit signal lines or a signal line group; and when configured in this manner, the non-acknowledgement response factor information generation circuit 82 may be omitted.

With the third embodiment, the random number RN and the retry set value SRI are added and the retry interval value RIN is calculated within the slave interface 4c and then sent to the master interface 2c to determine the length of the retry interval time until the transmission request REQb is to be resent based on the retry interval value RIN. With the third embodiment as well, since the point that the retry set value SRI and the random number RN are added to give the retry interval value RIN is the same as with the first embodiment, development of live-lock may be prevented, and in addition, even if it should fall into a live-lock situation, this may be resolved. In addition, since the retry set value SRI used has a value that is uniquely set for the slave device, even in the case where various slave devices having widely varying transmission preparation times connected to the bus, the retry interval time may be set within a range that is appropriate for the respective slave devices.

With the third embodiment, since the pseudo-random number generator and adder are only in the slave interface, in a bus system with a configuration where there are few slave devices and many master devices connected to the bus, the amount of additional hardware may be kept smaller than even the first embodiment.

It should be noted that in FIG. 5 and FIG. 7, the retry interval counting unit 33 is configured with the retry interval value register 12, the retry interval counter 13, and the comparator 14. In place of the retry interval counter 13 in the same manner as the case in FIG. 1, however, a retry interval from the adder 32 may be preset when the non-acknowledgement response NACKb is received and a decrementing retry interval counter provided that decrements with every clock pulse, and then in place of the comparator 14, a zero comparator may be provided to detect when the count value of the decrement counter has reached zero and output a retry time notification signal RT. By configuring the retry interval counting unit 33 in this manner, the retry interval value register becomes unnecessary and the circuitry for the zero comparator may be simplified.

In the same manner, in FIG. 5 and FIG. 7, the retry attempt counting unit 34 is configured with the retry attempt register 15, the retry attempt counter 16, and the comparator 17. However, in the same manner as with FIG. 1, in place of the retry attempt counter 16, [NOTE: ERROR CORRECTION] a value that has "1" added to the predetermined permissible retry count PRC when a transmission request REQm from the master unit is received may be preset, and a decrementing retry attempt counter provided that decrements each time the non-acknowledgement response NACKb is received. Then in place of the comparator 17, a zero comparator may be provided to detect when the count value of the decrement counter has reached zero and output an overflow signal OF. By configuring the retry attempt counting unit 34 in this manner, the retry attempt register becomes unnecessary and the circuitry for the zero comparator may be simplified.

Figure 9:
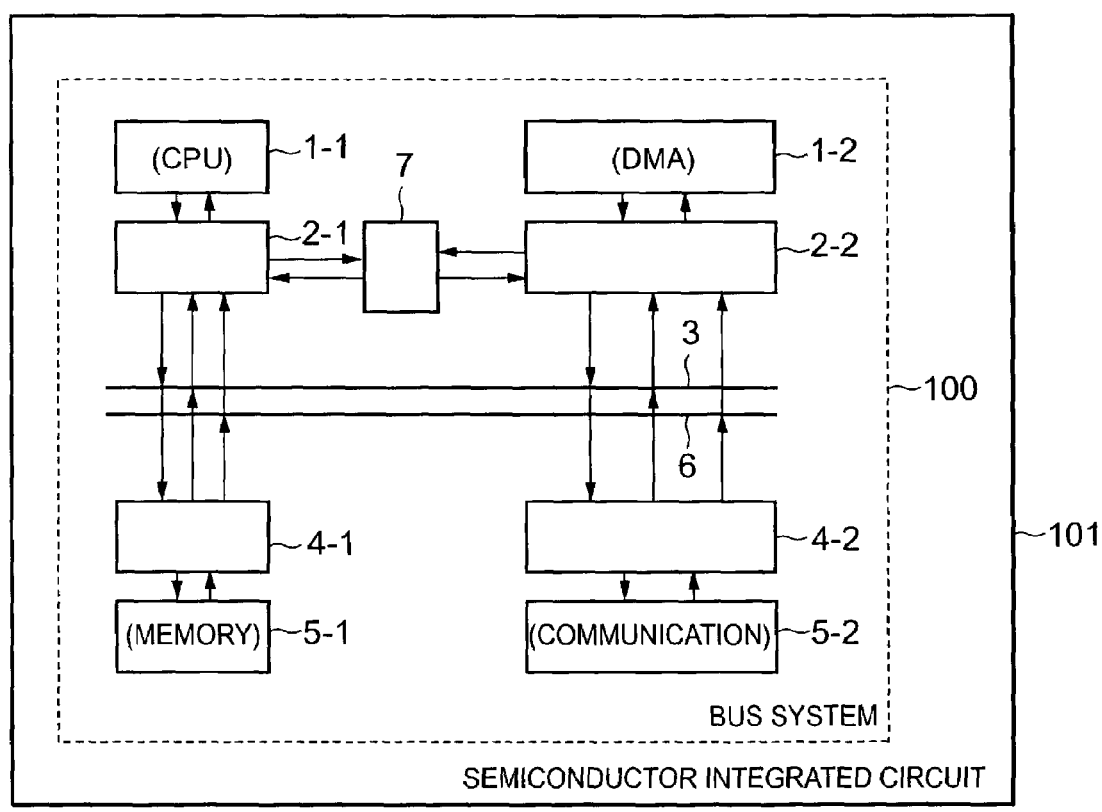
FIG. 9 is a diagram showing an example of a semiconductor integrated circuit loaded with the present invention.

FIG. 9 is a diagram of an example of a semiconductor integrated circuit loaded with a bus system according to the present invention. A semiconductor integrated circuit 101 is internally equipped with a bus system 100 of the present invention, wherein the bus system 100 has a bus master 1-1, which is a CPU, connected to a CW bus 3 via a master interface 2-1; a bus master 1-2, which is a direct memory access (DMA) controller, connected to the CW bus 3 via a master interface 2-2; a slave unit 5-1, which is memory, connected to the CW bus 3 via a master interface 4-1; and a slave unit 5-2, which is an external communication I/O, connected to the CW bus 3 via a slave interface 4-2. An arbitration circuit is labeled with reference numeral 7 and an RD bus is labeled with reference numeral 6. By providing the bus system 100, live-lock occurrence may be prevented in the semiconductor integrated circuit 101 beforehand, and even if a live-lock situation should develop, this may be resolved.

Figure 10:
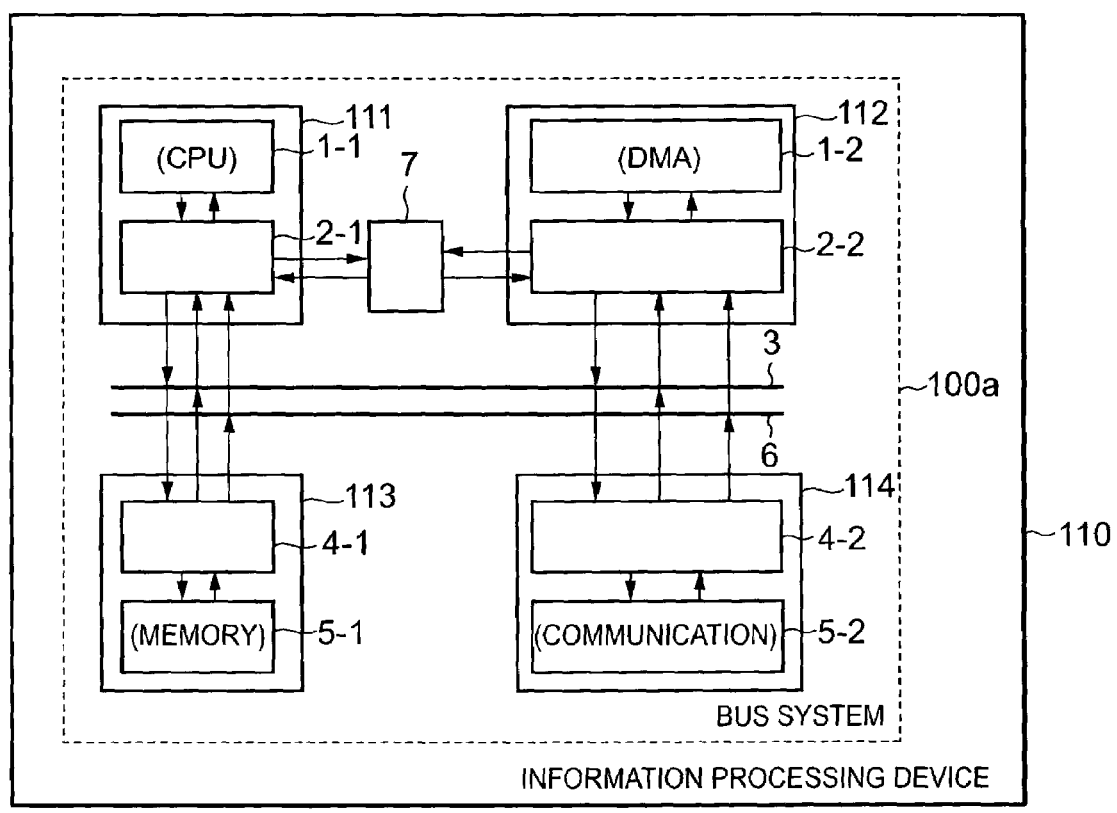
FIG. 10 is a diagram showing an example of information processing device including the present invention.

FIG. 10 is a diagram of an example of an information processing device that includes the bus system according to the present invention. The information processing device 110 includes a bus system 100a, wherein the bus system 100a is configured equipped with a microcomputer chip 111 that includes a master interface 2-1 connected to the CW bus 3; a DMA chip 112 that includes a master interface 2-2 connected to the CW bus 3; a memory chip 113 that includes a slave interface 4-1 connected to the CW bus 3; and a communication I/O chip that includes a slave interface 4-2 connected to the CW bus 3. As with FIG. 9, an arbitration circuit is labeled with reference numeral 7 and an RD bus is labeled with reference numeral 6. By providing the bus system 100a, live-lock occurrence may be prevented in the information processing device 110 beforehand, and even if a live-lock situation should develop, this may be resolved.

Figure 11:
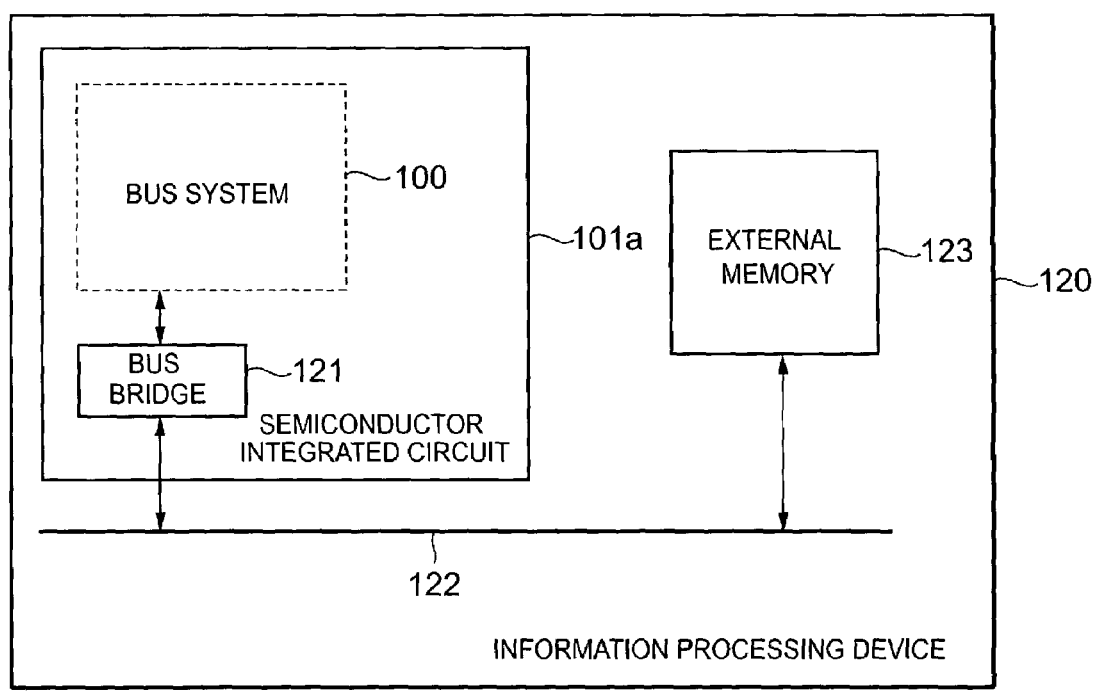
FIG. 11 is a diagram showing an example of an information processing device having a semiconductor integrated circuit loaded with the present invention.

FIG. 11 is a diagram of an example of an information processing device including a semiconductor integrated circuit loaded with a bus system according to the present invention. An information processing device 120 is configured including a semiconductor integrated circuit 101a equipped with a bus system 100 according to the present invention; an external bus 122; and an external memory 123. The bus system 100 is connected to the external bus 122 via a bus bridge 121, wherein the CPU (see FIG. 9) inside the bus system 100 has a configuration that allows the external memory 123 to be accessed via the CW bus 3 and the RD bus 6 in the bus system, the bus bridge 121, and the external bus 122. With this information processing device 120 as well, by providing the bus system 100 [NOTE: ERROR CORRECTION] in the semiconductor integrated circuit 101a, live-lock occurrence may be prevented beforehand, and even if a live-lock situation should develop, this may be resolved.

As described above, by applying the present invention, live-lock occurrence may be prevented beforehand, and even if the extremely rare case of falling into a live-lock situation should develop, this may be resolved. In addition, since the retry set value SRI used has a value that is uniquely set for the slave device and sent from the slave device to which the transmission request has been made, even in the case where various slave devices having widely varying transmission preparation times are connected to the bus, the retry interval time may be set within a range that is appropriate for the respective slave devices. Furthermore, the amount of hardware added to avoid live-locks may be drastically reduced in comparison with the bus system that uses the technique described in Japanese Patent Application Laid-open No. Hei 9-114750, and the drop in bus access efficiency due to exclusive bus access that develops when attempting to avoid live-locks using the technique described in Japanese Patent Application Laid-open No. 2000-250850 may be avoided.

What is claimed is:

1. A bus system comprising:
a slave interface provided between a slave unit and a bus, said slave interface being equipped with a retry set value storage circuit that stores a retry set value uniquely set for said slave unit and a pseudo-random number generator that generates a pseudo random number, and said slave interface transmitting, when negating a transmission request from a master unit, a non-acknowledgement response and non-acknowledgement response incidental information, said non-acknowledgement response incidental information including said retry set value and said random number generated by said pseudo-random number generator to the master unit via said bus; and a master interface provided between said master unit and said bus, said master interface including:
a retry information extraction circuit that inputs said non-acknowledgement response incidental information from said bus and extracts and output said retry set value and said random number value,
an adder that calculates a retry interval value by adding said retry set value and said random number value,
a retry interval counting unit that begins counting clock pulses upon reception of said non-acknowledgement response and outputs a retry time notification signal upon detection that the counted value has reached said retry interval value,
a retry count counting unit that begins counting the number of times said non-acknowledgement response is received once said transmission request is received from said master unit and outputs an overflow signal upon detection that the counted value has exceeded a preset permissible retry count, and
a retry request circuit that activates resending of a transmission request upon detection that said overflow signal is inactive level and said retry time notification signal is active level.

2. The bus system according to claim 1, wherein said random number is renewed by the pseudo-random number generator every time a non-acknowledgement response is generated inside a slave interface.

3. The bus system according to claim 1, wherein said random number is renewed by the pseudo-random number generator every time it is detected that there is a transmission request to said slave unit that is connected to said slave interface.

4. A bus system comprising:
a slave interface provided between a slave unit and a bus; said slave interface including:
an address decoder that receives from a master unit a transmission request and an address via said bus and outputs an address condition detection signal if the transmission request is for said slave unit,
a response condition determination circuit that determines whether or not to respond to said transmission request from said master unit depending on said address condition detection signal, a command from said master unit, and operational conditions of said slave unit, and either outputs an acknowledgement response to said bus when ready for response or outputs a non-acknowledgement response to said bus when not ready for response,
a retry set value storage circuit that stores a retry set value uniquely set for said slave unit,
a pseudo-random number generator that is activated with a predetermined signal so as to generate a random number, and
a non-acknowledgement response incidental information generating circuit that follows when said non-acknowledgement response is output and outputs non-acknowledgement response incidental information, which includes said retry set value and said random number value generated by said pseudo-random number generator; and a master interface provided between said master unit and said bus, said master interface including:
  a retry information extraction circuit that inputs said non-acknowledgement response incidental information from said bus and extracts and outputs said retry set value and said random number value,
  an adder that calculates a retry interval value by adding said retry set value and said random number value,
  a retry interval counting unit that begins counting clock pulses upon reception of said non-acknowledgement response and outputs a retry time notification signal upon detection that the counted value has reached said retry interval value,
  a retry count counting unit that begins counting the number of times said non-acknowledgement response is received once said transmission request is received from said master unit and outputs an overflow signal upon detection that the counted value has exceeded a preset pennissible retry count, and
  a retry request circuit that activates resending of a transmission request upon detection that said overflow signal is inactive level and said retry time notification signal is active level.

5. The bus system according to claim 4, wherein said retry set value is a coded retry set value; and said retry information extraction circuit includes a decoding function for said coded retry set value.

6. The bus system according to either claim 4, wherein the predetermined signal that activates said pseudo-random number generator is the non-acknowledgement response from said response condition determination circuit.

7. The bus system according to either claim 4, wherein the predetermined signal that activates said pseudo-random number generator is the address condition detection signal from said address decoder.

8. A bus system comprising:
  a slave interface provided between a slave unit and a bus; said slave interface equipped with a retry set value storage circuit that stores a retry set value uniquely set for said slave unit; and said slave interface transmitting a non-acknowledgement response when rejecting to respond to a transmission request from a master unit, and also transmits non-acknowledgement response incidental information that includes said retry set value to said master unit via said bus; and
  a master interface provided between said master unit and said bus; said master interface including:
    a retry information extraction circuit that inputs said non-acknowledgement response incidental information from said bus and extracts and output said retry set value and said random number value,
    an adder that calculates a retry interval value by adding said retry set value and said random number value,
    a retry interval counting unit that begins counting clock pulses upon reception of said non-acknowledgement response and outputs a retry time notification signal upon detection that the counted value has reached said retry interval value,
    a retry count counting unit that begins counting the number of times said non-acknowledgement response is received once said transmission request is received from said master unit and outputs an overflow signal upon detection that the counted value has exceeded a preset pennissible retry count, and
    a retry request circuit that activates resending of a transmission request upon detection that said overflow signal is inactive level and said retry time notification signal is active level.

9. The bus system according to claim 8, wherein said random number is renewed by the pseudo-random number generator every time a non-acknowledgement response is received inside said master interface.

10. The bus system according to claim 8, wherein said random number is renewed by the pseudo-random number generator every time said transmission request is output from said master interface to said slave unit.

11. A bus system comprising:
  a slave interface provided between a slave unit and a bus, said slave interface including:
    an address decoder that receives from a master unit a transmission request and an address via said bus and outputs an address condition detection signal if the transmission request is for said slave unit,
    a response condition determination circuit that determines whether or not to respond to said transmission request from said master unit depending on said address condition detection signal, a command from the master unit, and operational conditions of said slave unit, and either outputs an acknowledgement response to said bus when ready for response or outputs a non-acknowledgement response to said bus when not ready for response,
    a retry set value storage circuit that stores a retry set value uniquely set for said slave unit, and
    a non-acknowledgement response incidental information generating circuit that follows when said non-acknowledgement response is output and outputs non-acknowledgement response incidental information, which includes said retry set value; and
  a master interface provided between said master unit and said bus, said master interface including,
    a retry information extraction circuit that inputs said non-acknowledgement response incidental information from said bus and extracts and outputs said retry set value,
    a pseudo-random number generator that is activated with a predetermined signal so as to generate a pseudo-random number,
    an adder that calculates a retry interval value by adding said retry set value and said random number value generated by said pseudo-random number generator;
    a retry interval counting unit that begins counting clock pulses upon reception of said non-acknowledgement response and outputs a retry time notification signal upon detection that the counted value has reached said retry interval value,
    a retry count counting unit that begins counting the number of times said non-acknowledgement response is received once said transmission request is received from said master unit and outputs an overflow signal upon detection that the counted value has exceeded a preset permissible retry count, and
    a retry request circuit that activates resending of a transmission request upon detection that said overflow signal is inactive level and said retry time notification signal is active level.

12. The bus system according to claim 11, wherein said retry set value is a coded retry set value; and said retry information extraction circuit includes a decoding function for said coded retry set value.

13. The bus system according to either claim 11, wherein the predetermined signal that activates said pseudo-random number generator is the non-acknowledgement response received by the master interface.

14. The bus system according to either claim 11, wherein the predetermined signal that activates said pseudo-random number generator is the transmission request to the slave unit that is output by the master interface to the bus.

15. A bus system comprising:
a slave interface provided between a slave unit and a bus; said slave interface equipped with a retry set value storage circuit that stores a retry set value uniquely set for said slave unit, a pseudo-random number generator that generates a pseudo-random number, and an adder that generates a retry interval value by adding the generated random number value and said retry set value; and said slave interface transmitting, when negating a transmission request from a master unit, a non-acknowledgement response and non-acknowledgement response incidental information, said non-acknowledgement response incidental information including said retry interval value to the master unit via said bus; and
a master interface provided between said master unit and said bus, said master interface including:
  a retry information extraction circuit that inputs said non-acknowledgement response incidental information from said bus and extracts and output said retry set value and said random number value,
  an adder that calculates a retry interval value by adding said retry set value and said random number value,
  a retry interval counting unit that begins counting clock pulses upon reception of said non-acknowledgement response and outputs a retry time notification signal upon detection that the counted value has reached said retry interval value,
  a retry count counting unit that begins counting the number of times said non-acknowledgement response is received once said transmission request is received from said master unit and outputs an overflow signal upon detection that the counted value has exceeded a preset permissible retry count, and
  a retry request circuit that activates resending of a transmission request upon detection that said overflow signal is inactive level and said retry time notification signal is active level.

16. The bus system according to claim 15, wherein said random number is renewed by the pseudo-random number generator every time said non-acknowledgement response is generated inside said slave interface.

17. The bus system according to claim 15, wherein said random number is renewed by the pseudo-random number generator every time it is detected that there is a transmission request to said slave unit that is connected to said slave interface.

18. A bus system comprising:
a slave interface provided between a slave unit and a bus, said slave interface including:
  an address decoder that receives from a master unit a transmission request and an address via said bus and outputs an address condition detection signal if the transmission request is for said slave unit,
  a response condition determination circuit that determines whether or not to respond to said transmission request from said master unit depending on said address condition detection signal, a command from the master unit, and operational conditions of said slave unit, and either outputs an acknowledgement response to said bus when ready for response or outputs a non-acknowledgement response to said bus when not ready for response,
  a retry set value storage circuit that stores a retry set value uniquely set for said slave unit,
  a pseudo-random number generator that is activated with a predetermined signal so as to generate a pseudo-random number,
  an adder that generates a retry interval value by adding the generated random number value and said retry set value, and
  a non-acknowledgement response incidental information generating circuit that follows when said non-acknowledgement response is output and outputs non-acknowledgement response incidental information, which includes said retry interval value; and
a master interface provided between said master unit and said bus, and
said master interface including:
  a retry information extraction circuit that inputs said non-acknowledgement response incidental information from said bus and extracts and outputs said retry interval value,
  a retry interval counting unit that begins counting clock pulses upon reception of said non-acknowledgement response and outputs a retry time notification signal upon detection that the counted value has reached said retry interval value,
  a retry count counting unit that begins counting the number of times said non-acknowledgement response is received once said transmission request is received from said master unit and outputs an overflow signal upon detection that the counted value has exceeded a preset permissible retry count, and
  a retry request circuit that activates resending of said transmission request upon detection that said overflow signal is inactive level and said retry time notification signal is active level.

19. The bus system according to claim 18, wherein the predetermined signal that activates said pseudo-random number generator is the non-acknowledgement response from said response condition determination circuit.

20. The bus system according to claim 18, wherein the predetermined signal that activates said pseudo-random number generator is the address condition detection signal from said address decoder.

* * * * *